US012734101B1

(12) United States Patent
Chen

(10) Patent No.: US 12,734,101 B1
(45) Date of Patent: Sep. 15, 2026

(54) NEGATIVE PRESSURE MASSAGE STRUCTURE AND MASSAGE DEVICE FOR SEXUAL STIMULATION

(71) Applicant: SHENZHEN AIKESAITE TECHNOLOGY CO., LTD., Shenzhen (CN)

(72) Inventor: Nachuan Chen, Shenzhen (CN)

(73) Assignee: Shenzhen Aikesaite Technology Co., Ltd., Shenzhen (CN)

( * ) Notice: Subject to any disclaimer, the term of this patent is extended or adjusted under 35 U.S.C. 154(b) by 0 days.

(21) Appl. No.: 19/415,878

(22) Filed: Dec. 11, 2025

(30) Foreign Application Priority Data

Aug. 8, 2025 (CN) .......................... 202511110314.1
Oct. 21, 2025 (CN) .......................... 202511508875.7

(51) Int. Cl.
*A61H 19/00* (2006.01)
*A61H 9/00* (2006.01)
*A61H 23/02* (2006.01)

(52) U.S. Cl.
CPC ........... *A61H 19/30* (2013.01); *A61H 9/0057* (2013.01); *A61H 19/44* (2013.01); *A61H 23/0254* (2013.01); *A61H 2201/0207* (2013.01); *A61H 2201/0264* (2013.01); *A61H 2201/105* (2013.01); *A61H 2201/5056* (2013.01)

(58) Field of Classification Search
CPC ...................................................... A61H 19/34
See application file for complete search history.

(56) References Cited

U.S. PATENT DOCUMENTS

2006/0206000 A1* 9/2006 Gloth ..................... A61H 19/34 600/38
2020/0281808 A1* 9/2020 Kirsten .................. A61H 23/04
2024/0238154 A1* 7/2024 Liu ...................... A61H 9/0007

FOREIGN PATENT DOCUMENTS

CN 114948637 A 8/2022
CN 116568254 A 8/2023
DE 202015002699 U1 * 7/2016 ......... A61H 23/0263
EP 2674142 A1 * 12/2013 ............. A61H 23/04
WO WO-2014081600 A1 * 5/2014 ........... A61H 9/0057

* cited by examiner

*Primary Examiner* — Thaddeus B Cox
(74) *Attorney, Agent, or Firm* — Ming Jiang; OPENPTO US LLC

(57) ABSTRACT

A negative pressure massage structure for sexual stimulation includes a negative pressure generating assembly, a first chamber, a first connection channel, and a waterproof-breathable assembly. The first chamber has at least one first opening in contact with a target massage area. The first connection channel connects the first chamber and the negative pressure generating assembly, and the first connection channel and the first chamber form a first airflow channel. The waterproof-breathable assembly is disposed in the first airflow channel, the waterproof-breathable assembly includes a support member and a waterproof-breathable membrane with waterproof-breathable properties, the support member is connected to an inner wall of the first airflow channel, and the waterproof-breathable membrane is disposed on the support member. The negative pressure generating assembly is configured to generate negative pressure at the first opening via the first airflow channel.

20 Claims, 14 Drawing Sheets

NEGATIVE PRESSURE MASSAGE STRUCTURE AND MASSAGE DEVICE FOR SEXUAL STIMULATION

CROSS-REFERENCE OF RELATED APPLICATION

The present application claims priorities to Chinese Patent Application No. 202511110314.1 filed on Aug. 8, 2025, and Chinese Patent Application No. 202511508875.7 filed on Oct. 21, 2025, which are incorporated herein by reference in entireties.

TECHNICAL FIELD

The present disclosure relates to the technical field of sex toys, and in particular to a negative pressure massage structure and massage device for sexual stimulation.

BACKGROUND

Currently, suction massage, as a stimulation method for inducing sexual pleasure in erogenous zones of human body (such as the clitoris, labia majora, labia minora, or nipples), has been widely used in the field of human health care. To meet the demand for suction massage, negative pressure massage devices are generally adopted. The basic principle is to produce pressure lower than atmospheric pressure by using a negative pressure generating device, where the pressure acts on a skin surface of an erogenous zone of human body through a suction nozzle to generate suction, lifting and other stimulation effects on the skin and subcutaneous tissues, thereby inducing sexual pleasure. However, when a negative pressure massage device in the prior art is used in a humid environment formed by a large amount of residual liquid substances (such as sweat, water vapor, or applied skin care products) on a skin surface of an erogenous zone of human body, the residual liquid substances are easily sucked into an interior of the massage device under the action of airflow when negative pressure is generated by a negative pressure device, such that a hygienic dead corner may be formed or a negative pressure generating device becomes damp or short-circuited, which further results in reduced reliability of the negative pressure massage device in use.

SUMMARY

A negative pressure massage structure and massage device for sexual stimulation are provided in the embodiments of the present disclosure, which reduces the probability that liquid substances are easily sucked into an interior of the negative pressure massage structure to form a hygienic dead corner or a negative pressure generating device is short-circuited, thereby enhancing the reliability of the negative pressure massage structure in use.

In a first aspect, a negative pressure massage structure is provided in an embodiment of the present disclosure, including a negative pressure generating assembly, a first chamber, a first connection channel, and a waterproof-breathable assembly. The first chamber has at least one first opening in contact with a target massage area. The first connection channel connects the first chamber and the negative pressure generating assembly, and the first connection channel and the first chamber form a first airflow channel. The waterproof-breathable assembly is disposed in the first airflow channel, the waterproof-breathable assembly includes a support member and a waterproof-breathable membrane with waterproof-breathable properties, the support member is connected to an inner wall of the first airflow channel, and the waterproof-breathable membrane is disposed on the support member. The negative pressure generating assembly is configured to generate negative pressure at the first opening via the first airflow channel, such that the first opening exerts a stimulation effect on the target massage area.

In the above technical solution, the waterproof-breathable assembly is disposed in the first airflow channel, the waterproof-breathable assembly includes a waterproof-breathable membrane and a support member, and the waterproof-breathable membrane is disposed on the support member, such that the waterproof-breathable assembly plays a stable waterproof-breathable role in a negative pressure operation state, and the stable waterproof-breathable role of the waterproof-breathable assembly reduces the probability that when the liquid substances enter some areas of the first airflow channel to form hygienic dead corners or enter the negative pressure generating assembly to cause short circuits in the negative pressure generating assembly during the use of the negative pressure massage structure, thereby enhancing reliability of the negative pressure massage structure in use.

In some embodiments, the first chamber has a first end portion and a second end portion, the first end portion is close to the first opening, the second end portion is close to the first connection channel, the waterproof-breathable assembly is disposed in the first chamber, and the waterproof-breathable assembly is located between the first end portion and the second end portion.

In some embodiments, the negative pressure generating assembly includes a negative pressure pump.

In some embodiments, the waterproof-breathable membrane is coated with a hydrophobic coating.

In some embodiments, the waterproof-breathable membrane is one or more of an expanded polytetrafluoroethylene membrane, a thermoplastic polyurethane membrane, a polyethylene membrane, an acrylic membrane, a polypropylene membrane, a polyethersulfone membrane, a polyethylene terephthalate membrane, and a polyvinylidene fluoride membrane.

In some embodiments, a quick-release assembly is further included, and the support member is detachably connected to the inner wall of the first airflow channel through the quick-release assembly.

In some embodiments, an atomization assembly is further included, the first chamber has a first end portion and a second end portion, the first end portion is close to the first opening, the second end portion is close to the first connection channel, and the atomization assembly is disposed on the first end portion.

In some embodiments, a protective member is further included, the protective member is disposed in the first airflow channel, and the protective member is located between the first opening and the waterproof-breathable assembly.

In some embodiments, the first opening is made of a flexible material, and the flexible material is one or more of a thermoplastic elastomer (TPE), a polyolefin elastomer (POE), polyvinyl chloride (PVC), silicone, and liquid silicone.

In some embodiments, a first elastic member is further included, and the first elastic member is sleeved in the first connection channel.

In some embodiments, a solenoid valve is further included, the solenoid valve is disposed on the first connection channel, and the solenoid valve controls the opening or closing of the first connection channel.

In some embodiments, a second connection channel is further included, one end of the second connection channel communicates with the negative pressure generating assembly, and the other end thereof communicates with an exterior of the negative pressure massage structure, where when the solenoid valve closes the first connection channel, the negative pressure generating assembly extracts air through the second connection channel.

In a second aspect, a negative pressure massage structure is provided in an embodiment of the present disclosure, including a negative pressure generating assembly, a first chamber, a first connection channel, a waterproof-breathable assembly, and a first housing. The first chamber has at least one first opening in contact with a target massage area. The first connection channel connects the first chamber and the negative pressure generating assembly, and the first connection channel and the first chamber form a first airflow channel. The waterproof-breathable assembly is disposed in the first airflow channel, and the waterproof-breathable assembly includes a waterproof-breathable membrane with waterproof-breathable properties. The negative pressure generating assembly, the first chamber, and the first connection channel are respectively disposed in the first housing. The negative pressure generating assembly is configured to generate negative pressure at the first opening via the first airflow channel, such that the first opening exerts a stimulation effect on the target massage area.

In some embodiments, the first chamber has a first end portion and a second end portion, the first end portion is close to the first opening, the second end portion is close to the first connection channel, the waterproof-breathable assembly is disposed in the first chamber, and the waterproof-breathable assembly is located between the first end portion and the second end portion.

In some embodiments, the waterproof-breathable assembly further includes a support member, the support member is connected to the inner wall of the first airflow channel, and the waterproof-breathable membrane is disposed on the support member.

In some embodiments, the waterproof-breathable membrane is one or more of an expanded polytetrafluoroethylene membrane, a thermoplastic polyurethane membrane, a polyethylene membrane, an acrylic membrane, a polypropylene membrane, a polyethersulfone membrane, a polyethylene terephthalate membrane, and a polyvinylidene fluoride membrane.

In a third aspect, a massage device for sexual stimulation is provided in the present disclosure, including a negative pressure massage structure and a first massage structure, where the negative pressure massage structure includes a negative pressure generating assembly, a first chamber, a first connection channel, and a waterproof-breathable assembly. The first chamber has at least one first opening in contact with a target massage area. The first connection channel connects the first chamber and the negative pressure generating assembly, and the first connection channel and the first chamber form a first airflow channel. The waterproof-breathable assembly is disposed in the first airflow channel, the waterproof-breathable assembly includes a support member and a waterproof-breathable membrane with waterproof-breathable properties, the support member is connected to an inner wall of the first airflow channel, and the waterproof-breathable membrane is disposed on the support member. The negative pressure generating assembly is configured to generate negative pressure at the first opening via the first airflow channel, such that the first opening exerts a stimulation effect on the target massage area. The first massage structure is connected to the negative pressure massage structure.

In some embodiments, a connecting member is further included, and the first massage structure is flexibly connected to the negative pressure massage structure through the connecting member.

In some embodiments, a vibration assembly is further included, the vibration assembly is disposed in the first massage structure, and the vibration assembly drives the first massage structure to vibrate.

In some embodiments, a heating assembly is further included, the heating assembly is disposed in the first massage structure, and the heating assembly performs heat exchange with the first massage structure.

BRIEF DESCRIPTION OF THE DRAWINGS

To describe the technical solution in the embodiments of the present disclosure more clearly, the accompanying drawings required for describing the embodiments are briefly described below. It is to be understood that the following accompanying drawings show merely some embodiments of the present disclosure, and therefore it is not to be construed as a limitation to the scope. Those of ordinary skill in the art can also derive other accompanying drawings from these accompanying drawings without making inventive efforts.

REFERENCE NUMERALS IN THE FIGURES

Figure 1:
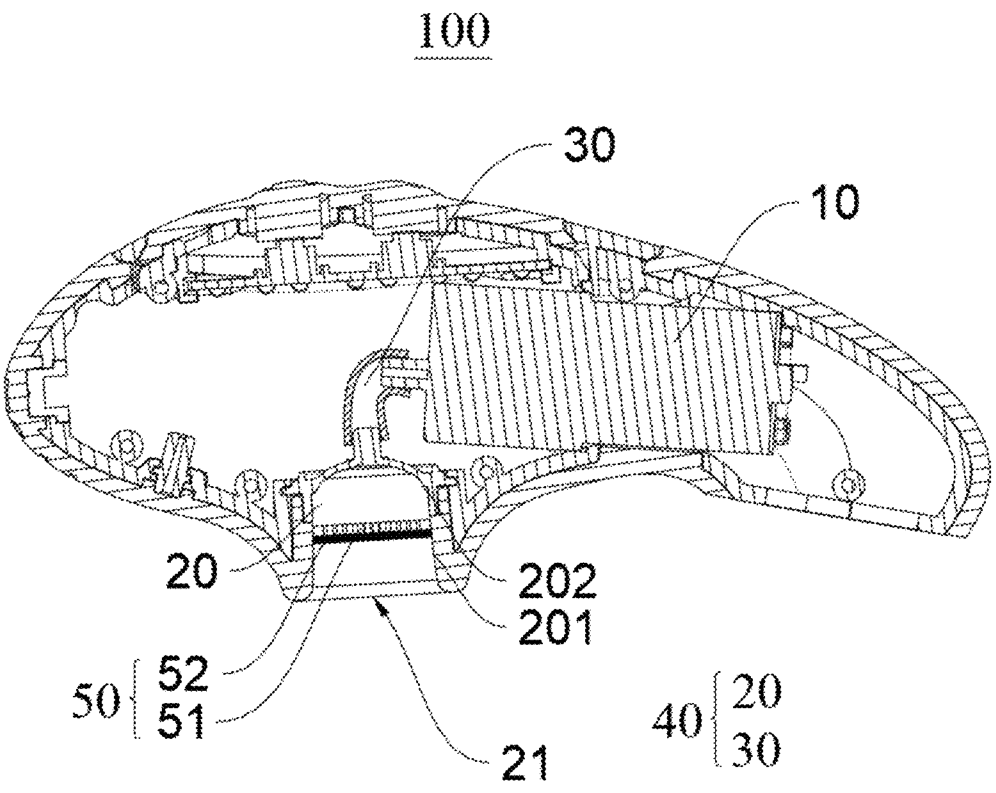
FIG. 1 is a schematic structural diagram of a negative pressure massage structure for sexual stimulation provided in some embodiments of the present disclosure.

1000—massage device;

100—negative pressure massage structure, 10—negative pressure generating assembly, 20—first chamber, 201—first end portion, 202—second end portion, 21—first opening, 30—first connection channel, 31—first air outlet part, 32—first air inlet part, 40—first airflow channel, 50—waterproof-breathable assembly, 51—support member, 511—ventilation hole, 52—waterproof-breathable membrane, 60—first housing, 61—extension portion, 62—second opening, 70—hydrophobic coating, 80—quick-release assembly, 81—first threaded portion, 82—second threaded portion, 83—first snap-fit portion, 84—second snap-fit portion, 90—atomization assembly, 110—protective member, 111—first protective member, 112—second protective member, 120—first elastic member, 130—solenoid valve, 140—second connection channel, 150—second elastic member;

200—first massage structure, 210—first massage portion, 211—second housing, 212—connecting member, 213—vibration assembly, and 214—heating assembly.

DETAILED DESCRIPTION OF PREFERRED EMBODIMENTS

In order to make the objectives, technical solutions and advantages of the embodiments of the present disclosure clearer, the technical solutions in the embodiments of the present disclosure will be clearly and completely described below in combination with the accompanying drawings in the embodiments of the present disclosure. Apparently, the embodiments described are merely some rather than all of the embodiments of the present disclosure. Based on the embodiments of the present disclosure, all other embodiments acquired by those of ordinary skill in the art without making creative efforts fall within the scope of protection of the present disclosure.

Unless defined otherwise, all technical and scientific terms used herein have the same meanings as commonly understood by those skilled in the art to which the present disclosure belongs. The terms used in the specification of the present disclosure are for the purpose of describing specific embodiments merely and are not intended to limit the present disclosure. The terms "including" and "having", and any variations thereof in the specification, the claims and the above accompanying drawings are intended to cover non-exclusive inclusion. The terms "first", "second" and the like in the specification and the claims or the above accompanying drawings are used to distinguish different objects and are not intended to indicate a specific order or hierarchical relationship.

When the term "example" is referred to herein, it means that specific features, structures or characteristics described in combination with the example are included in at least one example of the present disclosure. When this phrase occurs at various positions in the specification, it neither necessarily refers to the same embodiment, nor refers to an independent or alternative embodiment mutually exclusive to other embodiments. Those skilled in the art understand both explicitly and implicitly that the embodiments described herein can be combined with other embodiments.

In the description of the present disclosure, it is to be noted that, unless otherwise explicitly specified and defined, the terms “mounting”, “connected”, “connecting” and “attaching” are to be understood in a broad sense, for example, they may be a fixed connection, a detachable connection, or an integrated connection; and may be a direct connection, or an indirect connection via an intermediate medium, or communication inside two elements. For those of ordinary skill in the art, the specific meanings of the above terms in the present disclosure may be understood according to specific circumstances.

Figure 2:
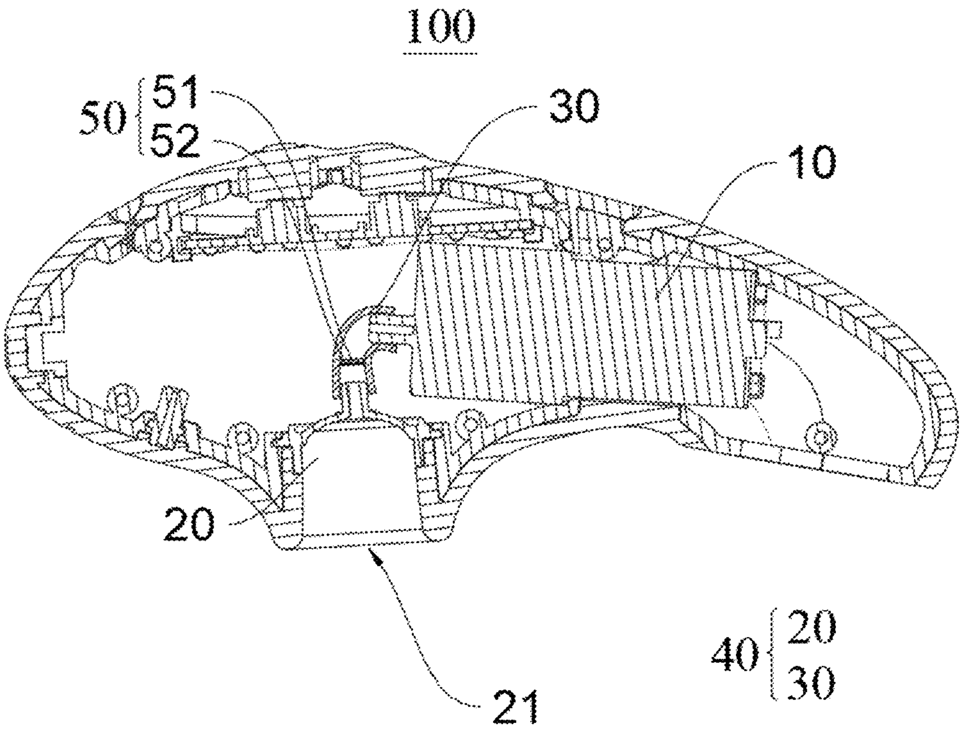
FIG. 2 is a schematic structural diagram of a negative pressure massage structure for sexual stimulation provided in other embodiments of the present disclosure.
Figure 3:
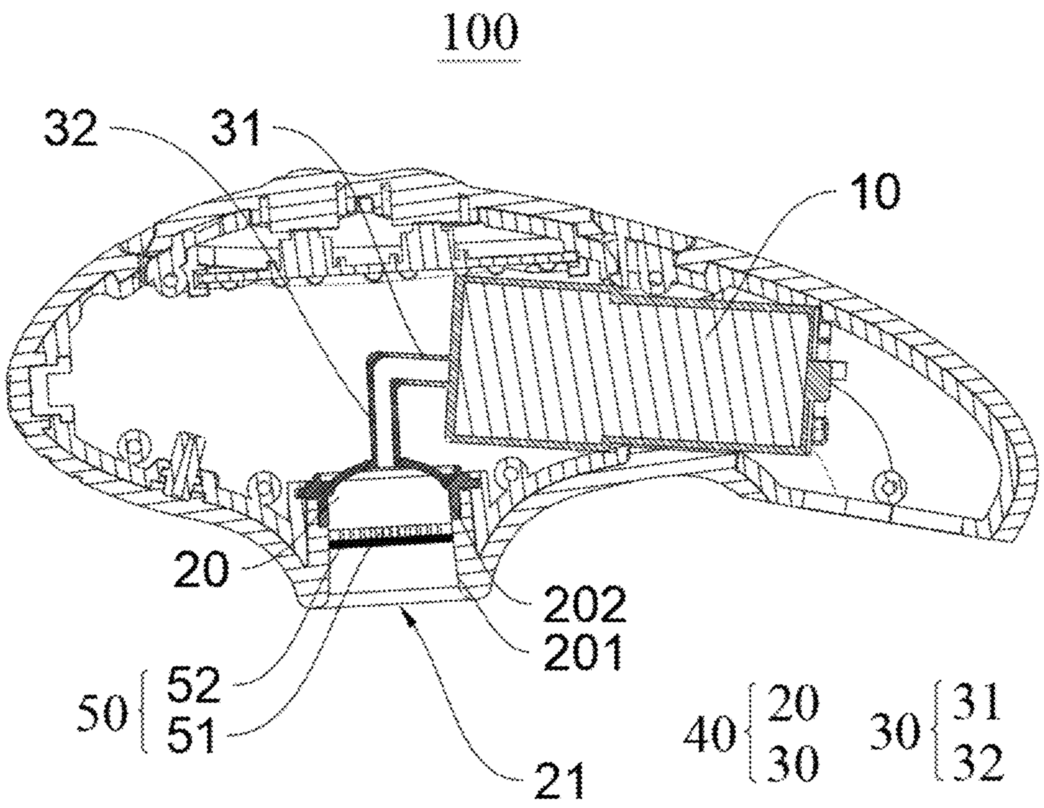
FIG. 3 is a schematic structural diagram of a negative pressure massage structure for sexual stimulation provided in some embodiments of the present disclosure (showing a first air outlet part and a first air inlet part).
Figure 4:
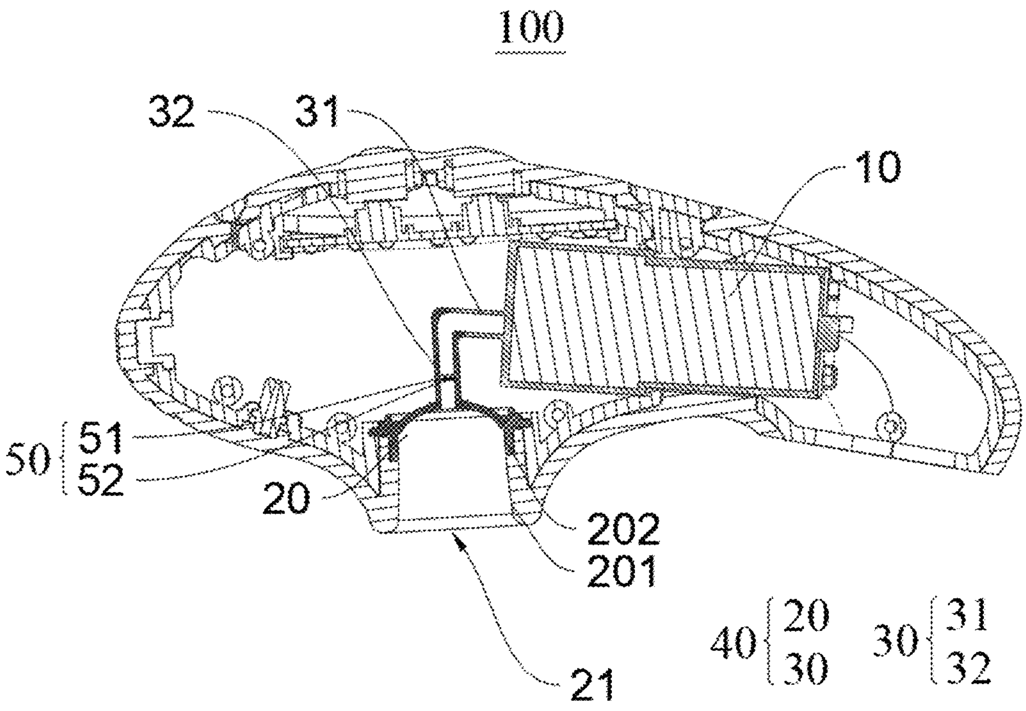
FIG. 4 is a schematic structural diagram of a negative pressure massage structure for sexual stimulation provided in other embodiments of the present disclosure (showing a first air outlet part and a first air inlet part).
Figure 5:
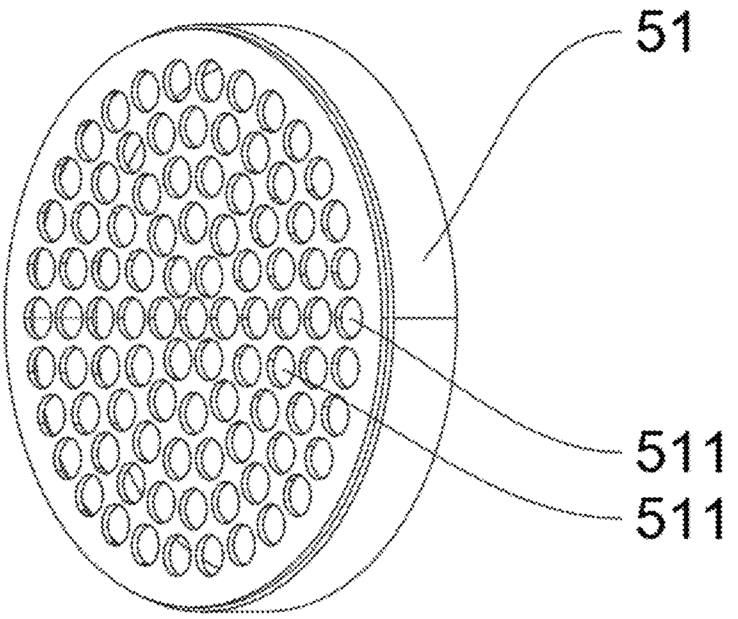
FIG. 5 is a schematic structural diagram of a support member in a negative pressure massage structure for sexual stimulation provided in some embodiments of the present disclosure.
Figure 6:
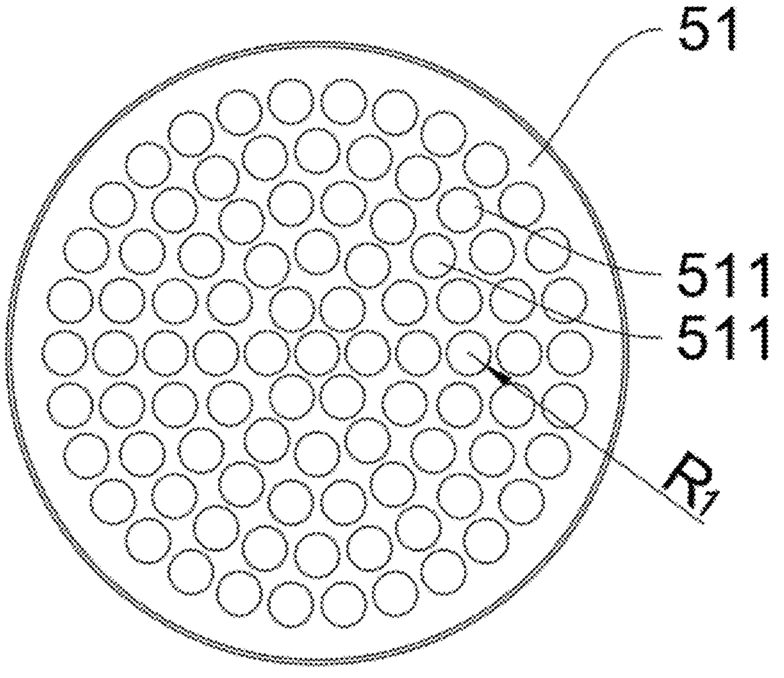
FIG. 6 is a schematic structural diagram of a support member in a negative pressure massage structure for sexual stimulation provided in other embodiments of the present disclosure.

Please refer to FIGS. 1 to 6. FIG. 1 is a schematic structural diagram of a negative pressure massage structure for sexual stimulation provided in some embodiments of the present disclosure, FIG. 2 is a schematic structural diagram of a negative pressure massage structure for sexual stimulation provided in other embodiments of the present disclosure, FIG. 3 is a schematic structural diagram of a negative pressure massage structure for sexual stimulation provided in some embodiments of the present disclosure (showing a first air outlet part and a first air inlet part), FIG. 4 is a schematic structural diagram of a negative pressure massage structure for sexual stimulation provided in other embodiments of the present disclosure (showing a first air outlet part and a first air inlet part), FIG. 5 is a schematic structural diagram of a support member in a negative pressure massage structure for sexual stimulation provided in some embodiments of the present disclosure, and FIG. 6 is a schematic structural diagram of a support member in a negative pressure massage structure for sexual stimulation provided in other embodiments of the present disclosure. A negative pressure massage structure 100 for sexual stimulation is provided in an embodiment of the present disclosure, including a negative pressure generating assembly 10, a first chamber 20, a first connection channel 30, and a waterproof-breathable assembly 50. The first chamber 20 has at least one first opening 21 in contact with a target massage area. The first connection channel 30 connects the first chamber 20 and the negative pressure generating assembly 10, and the first connection channel 30 and the first chamber 20 form a first airflow channel 40. The waterproof-breathable assembly 50 is disposed in the first airflow channel 40, the waterproof-breathable assembly 50 includes a support member 51 and a waterproof-breathable membrane 52 with waterproof-breathable properties, the support member 51 is connected to an inner wall of the first airflow channel 40, and the waterproof-breathable membrane 52 is disposed on the support member 51; and the negative pressure generating assembly 10 is configured to generate negative pressure at the first opening 21 via the first airflow channel 40, such that the first opening 21 exerts a stimulation effect on the target massage area.

The negative pressure generating assembly 10 may be a micro electric air pump, and the micro electric air pump extracts air from an enclosed chamber to form a continuous and stably adjustable negative pressure environment, thereby preventing discomfort caused by pressure fluctuations; the micro electric air pump has a fast response speed and a small size, and is suitable for use in small massagers; the micro electric air pump has good control compatibility, supports PWM speed regulation or voltage regulation, and may achieve switching between a pulse mode, a gradient mode, and other modes through programming (such as an alternating cycle of a suction mode and an exhaust mode); alternatively, the negative pressure generating assembly 10 may be an electromagnetically driven negative pressure unit, which drives a sliding magnetic block to reciprocate in a cylinder through an electromagnetic coil, and changes a volume of the chamber through displacement to generate negative pressure; and further, the negative pressure generating assembly 10 may employ a structural design of integrating a micro electric air pump and a solenoid valve, and for example, a piston-type solenoid valve serves as a basic structure, a negative pressure generating chamber is directly integrated into a valve body, and the negative pressure generating assembly 10 with an integrated design optimizes an assembly effect of the negative pressure massage structure.

The negative pressure generating assembly 10 refers to an assembly capable of generating negative pressure in the first chamber 20, rather than an assembly only capable of generating negative pressure in the first chamber 20; and for example, the negative pressure generating assembly 10 generates negative pressure in the first chamber 20 at a certain moment, and generates normal pressure or positive pressure in the first chamber 20 at another moment through cooperation with any other structure and control circuit program. For example, normal pressure or positive pressure in the first chamber 20 is achieved through setting of an exhaust position of the negative pressure generating assembly 10, position setting of a solenoid valve 130, or control of the negative pressure generating assembly 10.

One or more first openings 21 may be formed, and in an embodiment where a plurality of first openings 21 are formed, the plurality of first openings 21 are uniformly distributed on a side of the first chamber 20 facing the target massage area, and arrangement of the plurality of first openings 21 enables distribution of an airflow generated by the negative pressure generating assembly 10 to a plurality of areas, thereby increasing an area of massage stimulation and further improving a massage stimulation effect.

With further reference to FIGS. 1 and 2, the first connection channel 30 may be a first connection pipeline (not shown in FIGS. 1 and 2), and the first connection pipeline (not shown in FIGS. 1 and 2) may be a hose or a flexible pipe; and in an embodiment where the first connection pipeline (not shown in FIGS. 1 and 2) is a hose, two ends of the hose may be detachably connected to the first chamber 20 and the negative pressure generating assembly 10 respectively, and a detachable connection may be achieved by means of press-fitting or threads.

With further reference to FIGS. 3 and 4, the first connection channel 30 may alternatively include a first air outlet part 31 and a first air inlet part 32, the first air outlet part 31 communicates with the first air inlet part 32, the first air outlet part 31 may be a portion of an outer wall of the negative pressure generating assembly 10, and the first air inlet part 32 may be a portion of an outer wall of the first chamber 20.

A helical groove (not shown in FIGS. 1 to 4) may be formed on the inner wall of the first airflow channel 40, and formation of the helical groove (not shown in FIGS. 1 to 4) enables rotation of an airflow flowing in the first airflow channel 40, where the rotating airflow generates turbulence at the target massage area, thereby improving the massage stimulation effect.

The helical groove (not shown in FIGS. 1 to 4) formed on the inner wall of the first airflow channel 40 may be a helical groove (not shown in FIGS. 1 to 4) formed on an inner wall of the first connection channel 30, and in a direction of airflow, the helical groove (not shown in FIGS. 1 to 4) may extend from one end of the first connection channel 30 to the other end of the first connection channel 30 on the inner wall of the first connection channel 30; alternatively, a helical groove (not shown in FIGS. 1 to 4) may be formed on an inner wall of the first chamber 20, and in a direction of airflow, the helical groove (not shown in FIGS. 1 to 4) may extend from one end of the first chamber 20 to the other end of the first chamber 20 on the inner wall of the first chamber 20; and alternatively, both the inner wall of the first connection channel 30 and the inner wall of the first chamber 20 may be provided with helical grooves (not shown in FIGS. 1 to 4).

For the waterproof-breathable assembly 50 disposed in the first airflow channel 40, the waterproof-breathable assembly 50 may be disposed in the first connection channel 30, or the waterproof-breathable assembly 50 may be disposed in the first chamber 20.

The waterproof-breathable membrane 52 is waterproof and breathable mainly because there are millions of micropores on the membrane that are thousands of times thinner than human hair, water droplets with large surface tension cannot squeeze into these micropores, while extremely small air molecules penetrate the micropores freely.

When the waterproof-breathable membrane 52 is tightly attached to the skin of the target massage area, the waterproof-breathable membrane 52 is squeezed and deformed during massage, such that the micropores on the waterproof-breathable membrane 52 are closed, thereby leading to airflow interruption; and therefore, in an embodiment where the waterproof-breathable assembly 50 is disposed in the first chamber 20, it is necessary to ensure that a position of the waterproof-breathable assembly 50 is not in contact with the skin of the target massage area during massage.

The waterproof-breathable membrane 52 may be transparent or white, such that the user can directly observe grease or liquid (if any) on the waterproof-breathable membrane 52, to determine whether to clean the negative pressure massage structure 100.

The waterproof-breathable membrane 52 may be disposed on the support member 51 by means of bonding, and the bonding may be ultrasonic bonding, hot-melt bonding, or adhesive bonding.

The support member 51 may have a single-layer structure or a multi-layer structure, and in an embodiment where the support member 51 has the single-layer structure, the support member 51 may be made of a stainless steel material or plastic material; and with further reference to FIGS. 5 and 6, a ventilation hole 511 is formed on a surface of the support member 51, a plurality of ventilation holes 511 may be formed, the plurality of ventilation holes 511 are uniformly distributed on the support member 51, and the plurality of ventilation holes 511 are formed on the surface of the support member 51, such that the support member 51 has air permeability, where an aperture diameter of each of the ventilation holes 511 is denoted as R1, satisfying 0.1 mm≤R1≤0.5 mm. T1 may be 0.1 mm, 0.2 mm, 0.3 mm, 0.4 mm, 0.5 mm, or a value within a range composed of any two of the above values.

In an embodiment where the support member 51 is made of a stainless steel material or plastic material, the waterproof-breathable membrane 52 may be disposed on the support member 51 by means of adhesive bonding.

In an orthographic projection plane of the support member 51, an orthographic projection shape of the ventilation hole 511 may be rectangular or circular, and in an embodiment where the orthographic projection shape of the ventilation hole 511 is circular, the aperture diameter R1 of the ventilation hole 511 may be a radius of the ventilation hole 511.

When the ventilation holes 511 on the support member 51 are too small or too few, airflow resistance increases, thereby compromising an air suction effect of the negative pressure generating assembly 10; and when the ventilation holes 511 on the support member 51 are too large or too numerous, structural strength of the support member 51 is reduced, thereby compromising tensile strength of the waterproof-breathable assembly 50; and therefore, the plurality of ventilation holes 511 are uniformly distributed on the support member 51, and 0.1 mm≤R1≤0.5 mm, such that the number and size of the ventilation holes 511 are relatively reasonable under the premise of satisfying both the airflow resistance and the structural strength of the support member 51.

In an embodiment where the support member 51 has the single-layer structure, the support member 51 may be made of a ceramic material, and through the control of process conditions during a sintering process, pores may be formed on a surface of the ceramic material, such that the support member 51 has air permeability.

In an embodiment where the support member 51 is made of a ceramic material, the waterproof-breathable membrane 52 may be disposed on the support member 51 by means of adhesive bonding.

In an embodiment where the support member 51 has the single-layer structure, the support member 51 may be made of a screen mesh material, and a mesh count of the screen mesh is set, such that the support member 51 has air permeability.

In an embodiment where the support member 51 is made of the screen mesh material, the waterproof-breathable membrane 52 may be disposed on the support member 51 by means of ultrasonic bonding or hot-melt bonding.

In an embodiment where the support member 51 has the multi-layer structure, the support member 51 may include a stainless steel layer and a screen mesh layer, and the stainless steel layer is disposed on the screen mesh layer by means of adhesive bonding.

In an embodiment where the support member 51 includes the stainless steel layer and the screen mesh layer, the waterproof-breathable membrane 52 may be disposed on the screen mesh layer by means of ultrasonic bonding or hot-melt bonding.

With further reference to FIG. 1, the support member 51 has one side facing the first opening 21 and the other side away from the first opening 21, the waterproof-breathable membrane 52 may be disposed on the side of the support member 51 facing the first opening 21, the waterproof-breathable membrane 52 is disposed on the side of the support member 51 facing the first opening 21, and since the waterproof-breathable membrane 52 has a waterproof function, liquid substances are obstructed on the side of the waterproof-breathable membrane 52 facing the first opening 21, which reduces the probability of contact between the liquid substances and the support member 51, and extends the service life of the support member 51.

Alternatively, the waterproof-breathable membrane 52 may be disposed on the other side of the support member 51 away from the first opening 21, since the support member 51 has certain structural strength, when the waterproof-breathable membrane 52 is disposed on the other side of the support member 51 away from the first opening 21, the support member 51 effectively prevents the user's fingers from directly coming into contact with the waterproof-breathable membrane 52 when the user cleans the negative pressure massage structure 100, thereby reducing a probability that an external force generated by the fingers directly acts on the waterproof-breathable membrane 52, and further extends the service life of the waterproof-breathable assembly 50.

In this embodiment, the waterproof-breathable assembly 50 is disposed in the first airflow channel 40, the waterproof-breathable assembly 50 includes the support member 51 and the waterproof-breathable membrane 52 with waterproof-breathable properties, and the air permeability of the support member 51 and the waterproof-breathable properties of the waterproof-breathable membrane 52 ensure that the waterproof-breathable assembly 50 blocks the passage of liquid substances in the first airflow channel 40 while allowing the passage of air in the first airflow channel 40; the support member 51 is connected to the inner wall of the first airflow channel 40 and the waterproof-breathable membrane 52 is disposed on the support member 51, and since the support member 51 has a supporting function and the support member 51 is connected to the inner wall of the first airflow channel 40, the support member 51 well supports the waterproof-breathable membrane 52, such that the tensile strength of the waterproof-breathable assembly 50 increases; due to the increased tensile strength of the waterproof-breathable assembly 50, the waterproof-breathable assembly 50 is not easily pulled and damaged by an acting force generated by airflow in a negative pressure operation state; additionally, since the waterproof-breathable assembly 50 has the waterproof-breathable properties, the waterproof-breathable assembly 50 plays a stable waterproof-breathable role in the negative pressure operation state, such that during the use of the negative pressure massage structure 100, the negative pressure generating assembly 10 generates negative pressure at the first opening 21 through the first airflow channel 40, the skin of the target massage area in contact with the first opening 21 is sucked up, and the negative pressure massage structure 100 achieves a massage stimulation effect similar to suction; and in this case, the negative pressure generating assembly 10 sucks both liquid substances and air into the first airflow channel 40, and since the waterproof-breathable assembly 50 plays the stable waterproof-breathable role in the negative pressure operation state, the waterproof-breathable assembly 50 blocks the liquid substances, such that the liquid substances neither enter some areas of the first airflow channel 40 nor enter the negative pressure generating assembly 10 through the first airflow channel 40, which further reduces the probability that when the liquid substances enter some areas of the first airflow channel 40 to form hygienic dead corners or enter the negative pressure generating assembly 10 to cause short circuits in the negative pressure generating assembly 10 during the use of the negative pressure massage structure 100, thereby enhancing reliability of the negative pressure massage structure 100 in use.

In some embodiments, with further reference to FIGS. 1 and 3, the first chamber 20 has a first end portion 201 and a second end portion 202, the first end portion 201 is close to the first opening 21, the second end portion 202 is close to the first connection channel 30, the waterproof-breathable assembly 50 is disposed in the first chamber 20, and the waterproof-breathable assembly 50 is located between the first end portion 201 and the second end portion 202.

In this embodiment, since both a corner area in the second end portion 202 of the first chamber 20 away from the first opening 21 and an internal area of the first connection channel 30 are relatively narrow spaces, when liquid substances are sucked into the above narrow spaces, hard-to-clean hygienic dead corners are easily formed; and the waterproof-breathable assembly 50 is disposed in the first chamber 20, and the waterproof-breathable assembly 50 is located between the first end portion 201 and the second end portion 202, such that the waterproof-breathable assembly 50 with the waterproof-breathable function effectively prevents liquid substances from entering narrow spaces (such as the corner area in the second end portion 202 and the internal area of the first connection channel 30), thereby reducing a probability of generating hygienic dead corners, improving the hygiene of the negative pressure massage structure 100, and further enhancing the reliability of the negative pressure massage structure 100 in use.

In some embodiments, with further reference to FIGS. 1 to 4, the negative pressure generating assembly 10 includes a negative pressure pump.

In this embodiment, since the negative pressure pump achieves a negative pressure function in a small installation space, and the negative pressure generating assembly 10 is configured as a negative pressure pump to meet structural design requirements of the negative pressure massage structure 100.

Figure 7:
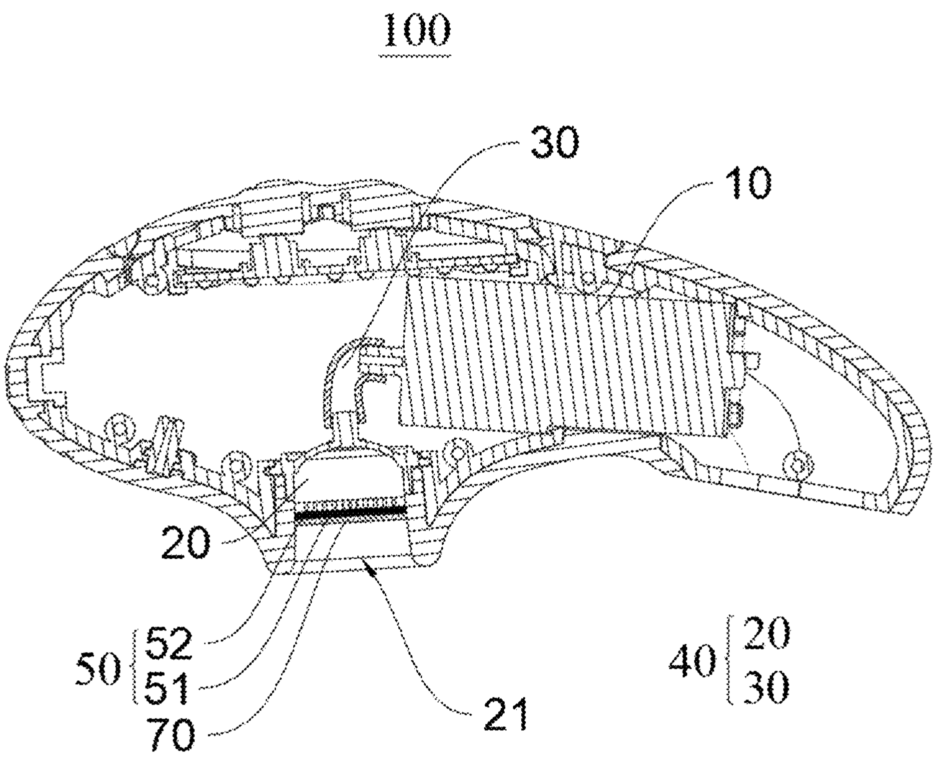
FIG. 7 is a schematic structural diagram of a negative pressure massage structure for sexual stimulation provided in some embodiments of the present disclosure (showing a hydrophobic coating).

In some embodiments, with reference to FIG. 7 (FIG. 7 is a schematic structural diagram of a negative pressure massage structure for sexual stimulation provided in some embodiments of the present disclosure (showing a hydrophobic coating)), the waterproof-breathable membrane 52 is coated with a hydrophobic coating 70.

The hydrophobic coating 70 may be disposed on the waterproof-breathable membrane 52 by means of bonding, and the bonding method may be ultrasonic bonding, hot-melt bonding, or adhesive bonding.

In this embodiment, since very weak attraction to water molecules by molecules of a coating material of the hydrophobic coating 70 and also an uneven surface of the hydrophobic coating 70 may reduce an actual contact area between water droplets and solids, a "lotus effect" may be formed on the surface of the hydrophobic coating 70; the hydrophobic coating 70 is disposed on the waterproof-breathable membrane 52, such that the "lotus effect" of the hydrophobic coating 70 prevents liquid substances from spreading on the surface of the hydrophobic coating 70, and small water droplets are formed and roll on the surface of the hydrophobic coating 70; and in this way, under the action of gravity, the liquid substances are easily discharged from the first opening 21.

In some embodiments, the waterproof-breathable membrane 52 is one or more of an expanded polytetrafluoroethylene membrane, a thermoplastic polyurethane membrane, a polyethylene membrane, an acrylic membrane, a polypropylene membrane, a polyethersulfone membrane, a polyethylene terephthalate membrane, and a polyvinylidene fluoride membrane.

The waterproof-breathable membrane 52 may be an oleophobic-modified expanded polytetrafluoroethylene membrane, and the expanded polytetrafluoroethylene membrane (i.e., an ePTFE membrane) is a porous membrane material made of polytetrafluoroethylene (PTFE) resin through an expansion process. This material has excellent air permeability (allowing air molecules to pass through) and barrier properties (liquid molecules hardly penetrate); and the ePTFE membrane inherits high and low-temperature resistance, chemical inertness, and aging resistance of PTFE, as well as flexible texture, and is not easily damaged when stretched or compressed by an external force.

The ePTFE membrane is inherently hydrophobic and blocks the passage of moisture, but exhibits weaker repellency to oily substances (such as essential oils for massage, and glycerin-based skin care products), and long-term contact with oily substances is likely to block the micropores due to the adhesion of oily substances, thereby compromising air permeability.

Therefore, repulsion capacity against oily substances may be enhanced through oleophobic modification (a surface performance optimization process for the ePTFE membrane).

A fluorine compound coating may be disposed on a surface of the ePTFE membrane to achieve an effect of oleophobic modification.

The oleophobic-modified ePTFE membrane may have a minimum thickness of 0.02 mm, which is suitable for the integration of small massager chambers and a wide range of application environments.

In this embodiment, since the ePTFE membrane, the thermoplastic polyurethane membrane, the polyethylene membrane, the acrylic membrane, the polypropylene membrane, the polyethersulfone membrane, the polyethylene terephthalate membrane, and the polyvinylidene fluoride membrane have good waterproof-breathable properties, flexibility, and chemical stability, the waterproof-breathable membrane 52 is one or more of the ePTFE membrane, the thermoplastic polyurethane membrane, the polyethylene membrane, the acrylic membrane, the polypropylene membrane, the polyethersulfone membrane, the polyethylene terephthalate membrane, and the polyvinylidene fluoride membrane, such that the waterproof-breathable membrane 52 has good waterproof-breathable properties.

Figure 8:
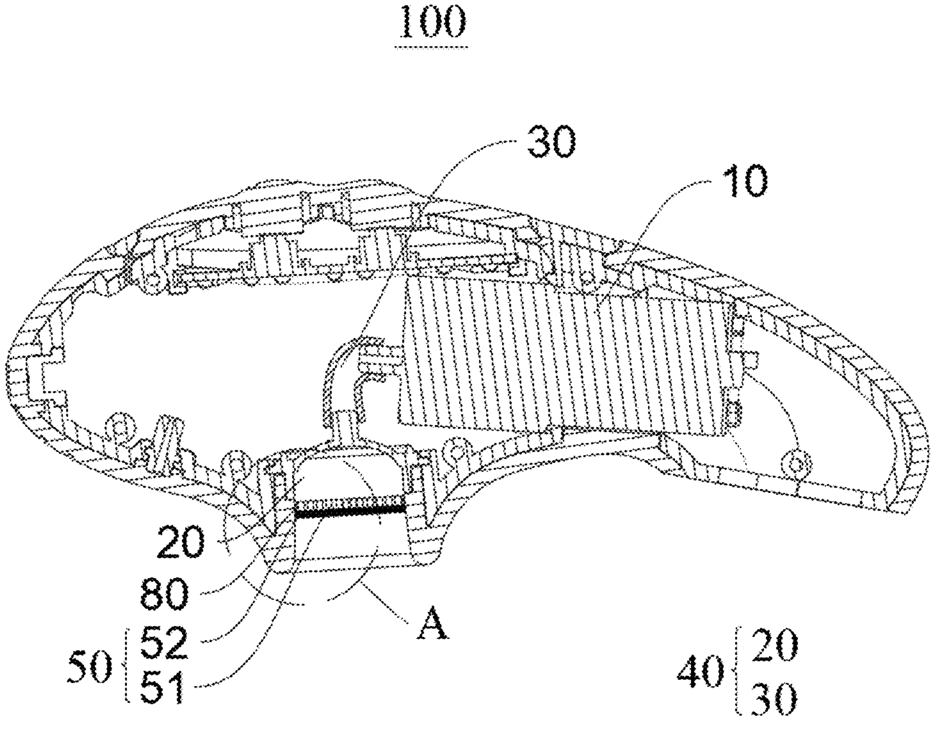
FIG. 8 is a schematic structural diagram of a negative pressure massage structure for sexual stimulation provided in some embodiments of the present disclosure (showing a quick-release assembly).
Figure 9:
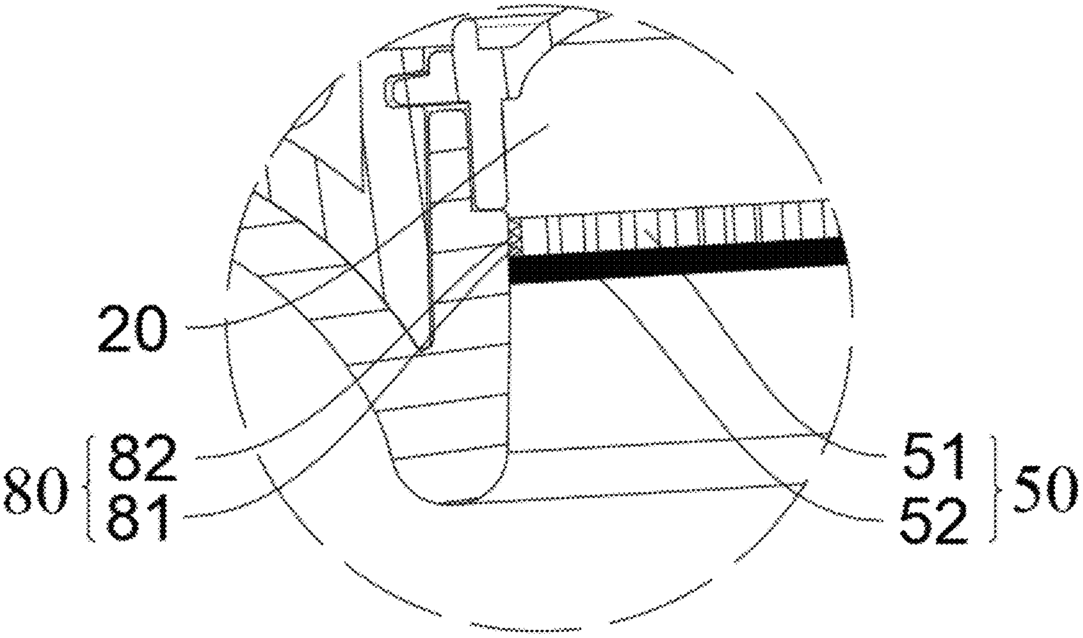
FIG. 9 is a partial enlarged view of a portion A in FIG. 8.
Figure 10:
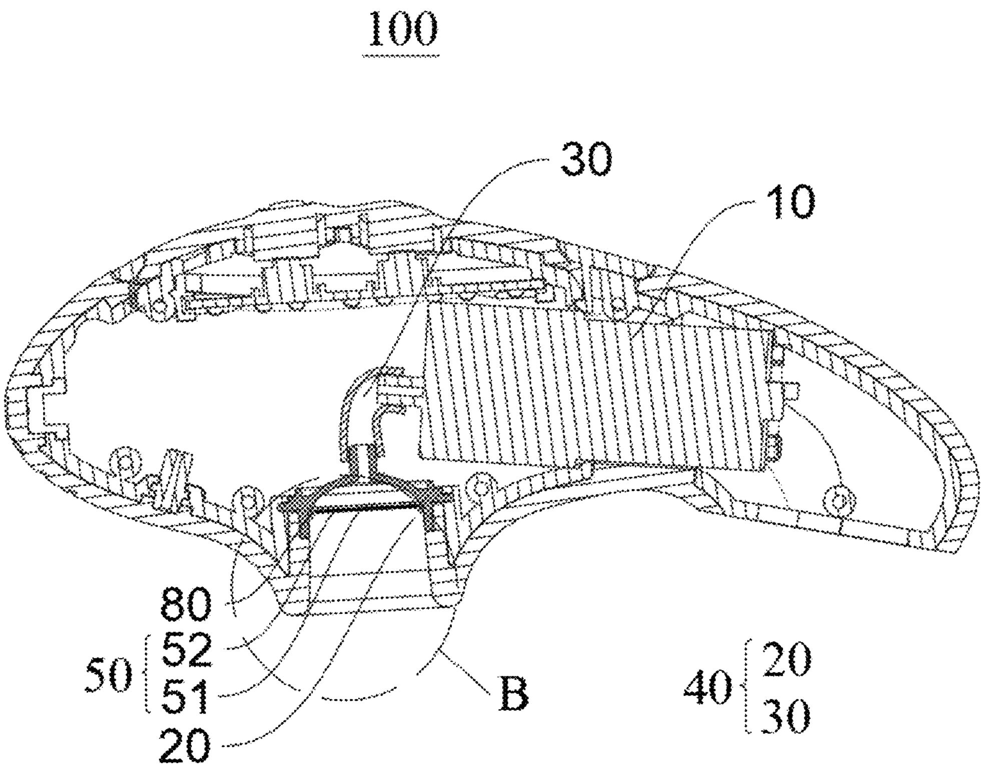
FIG. 10 is a schematic structural diagram of a negative pressure massage structure for sexual stimulation provided in other embodiments of the present disclosure (showing a quick-release assembly).
Figure 11:
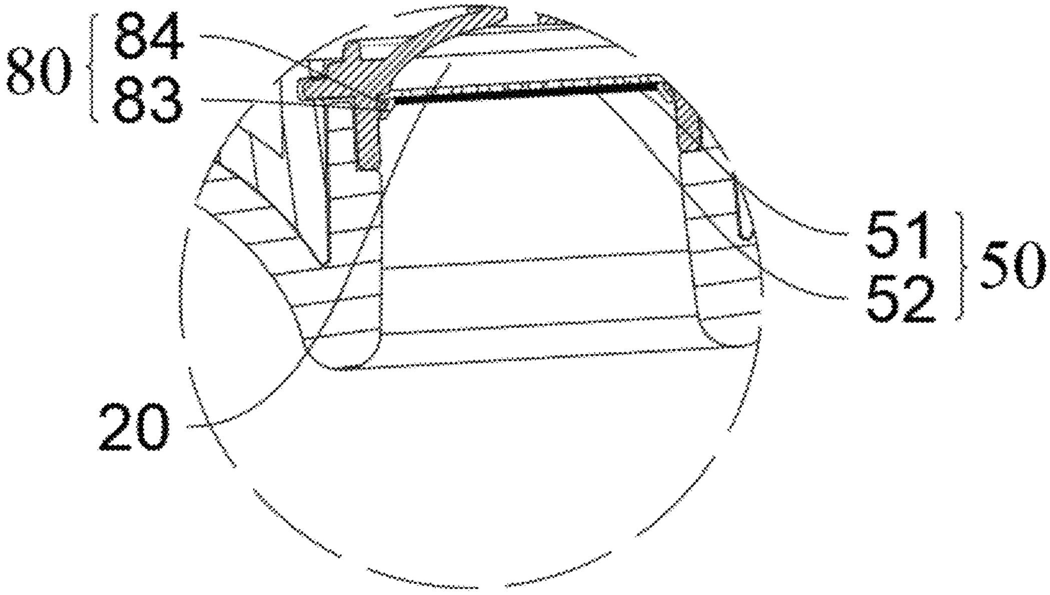
FIG. 11 is a partial enlarged view of a portion B in FIG. 10.

In some embodiments, with reference to FIGS. 8 to 11 (FIG. 8 is a schematic structural diagram of a negative pressure massage structure for sexual stimulation provided in some embodiments of the present disclosure (showing a quick-release assembly), FIG. 9 is a partial enlarged view of a portion A in FIG. 8, FIG. 10 is a schematic structural diagram of a negative pressure massage structure for sexual stimulation provided in other embodiments of the present disclosure (showing a quick-release assembly), and FIG. 11 is a partial enlarged view of a portion B in FIG. 10), a quick-release assembly 80 is further included, and the support member 51 is detachably connected to the inner wall of the first airflow channel 40 through the quick-release assembly 80.

The support member 51 may be connected to the inner wall of the first connection channel 30 through the quick-release assembly 80. Alternatively, the support member 51 may be connected to the inner wall of the first chamber 20 through the quick-release assembly 80.

The support member 51 may be detachably connected (such as a threaded connection or a snap-fit connection) to the inner wall of the first airflow channel 40 through the quick-release assembly 80. The detachable connection facilitates replacement of the waterproof-breathable assembly 50 by the user.

In this embodiment, the support member 51 is detachably connected to the inner wall of the first airflow channel 40 through the quick-release assembly 80, such that when the waterproof-breathable assembly 50 is installed, a connection between the support member 51 and the inner wall of the first airflow channel 40 is more secure, and the support member 51 withstands an external force and is not easily loosened or detached due to external factors such as vibration and pulling, thereby improving the tensile strength of the waterproof-breathable assembly 50; and when the waterproof-breathable assembly 50 is disassembled, the support member 51 is quickly disassembled from the inner wall of the first airflow channel 40, such that the waterproof-breathable assembly is quickly replaced.

With further reference to FIGS. 8 and 9, the quick-release assembly 80 includes a first threaded portion 81 and a second threaded portion 82 that are in threaded engagement with each other, the first threaded portion 81 is circumferentially disposed on an outer wall of the support member 51, and the second threaded portion 82 is circumferentially disposed on the inner wall of the first airflow channel 40.

The first threaded portion 81 may be an external thread or an internal thread.

The second threaded portion 82 may be an internal thread or an external thread.

In this embodiment, the first threaded portion 81 is disposed on the support member 51, the second threaded portion 82 is disposed on the first airflow channel 40, and the support member 51 and the inner wall of the first airflow channel 40 are fixed through the threaded engagement between the first threaded portion 81 and the second threaded portion 82, such that the connection between the support member 51 and the inner wall of the first airflow channel 40 is secure, and the support member 51 withstands an external force and is not easily loosened or detached due to external factors such as vibration and pulling, thereby further improving the tensile strength of the waterproof-breathable assembly 50; and similarly, the support member 51 may be quickly disassembled from the inner wall of the first airflow channel 40 through the threaded engagement between the first threaded portion 81 and the second threaded portion 82.

With further reference to FIGS. 10 and 11, the quick-release assembly 80 includes a first snap-fit portion 83 and a second snap-fit portion 84 that are in snap-fit engagement with each other, the first snap-fit portion 83 is circumferentially disposed on the outer wall of the support member 51, and the second snap-fit portion 84 is circumferentially disposed on the inner wall of the first airflow channel 40.

The first snap-fit portion 83 may be a snap-fit groove or a snap-fit clasp.

The second snap-fit portion 84 may be a snap-fit clasp or a snap-fit groove.

In this embodiment, the first snap-fit portion 83 is disposed on the support member 51, the second snap-fit portion 84 is disposed on the first airflow channel 40, and the support member 51 and the inner wall of the first airflow channel 40 are fixed through the snap-fit engagement between the first snap-fit portion 83 and the second snap-fit portion 84, such that the connection between the support member 51 and the inner wall of the first airflow channel 40 is secure, and the support member 51 withstands an external force and is not easily loosened or detached due to external factors such as vibration and pulling, thereby further improving the tensile strength of the waterproof-breathable assembly 50; and similarly, the support member 51 may be quickly disassembled from the inner wall of the first airflow channel 40 through the snap-fit engagement between the first snap-fit portion 83 and the second snap-fit portion 84.

Figure 12:
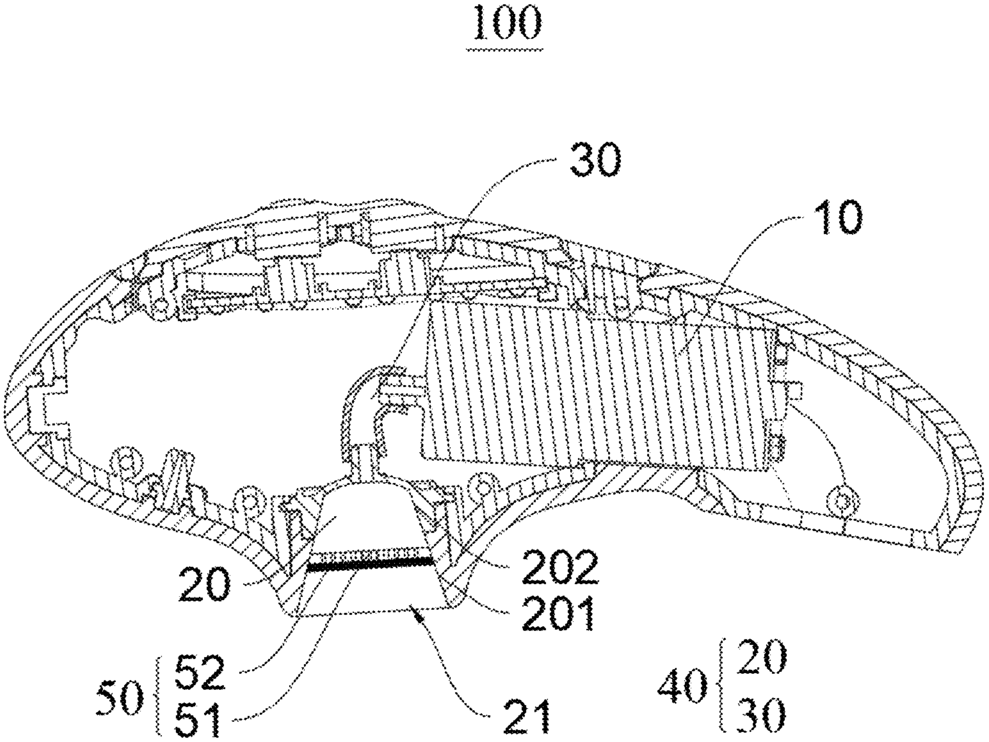
FIG. 12 is a schematic structural diagram of a negative pressure massage structure for sexual stimulation provided in still other embodiments of the present disclosure.

In some embodiments, with reference to FIG. 12 (FIG. 12 is a schematic structural diagram of a negative pressure massage structure for sexual stimulation provided in still other embodiments of the present disclosure), the first chamber 20 has a first end portion 201 and a second end portion 202, the first end portion 201 is close to the first opening 21, the second end portion 202 is close to the first connection channel 30, and a size of the first chamber 20 gradually decreases from the first end portion 201 to the second end portion 202.

A cross-sectional shape of the first chamber 20 may be rectangular or circular, and in an embodiment where the cross-sectional shape of the first chamber 20 is circular, the size of the first chamber 20 gradually decreases from the first end portion 201 to the second end portion 202, that is, a radius of the first chamber 20 gradually decreases from the first end portion 201 to the second end portion 202.

In this embodiment, the size of the first chamber 20 gradually decreases from the first end portion 201 to the second end portion 202, such that an interior of the first chamber 20 may be conical, and when air enters the first chamber 20 and flows from the first end portion 201 to the second end portion 202, a cross-sectional area of air circulation continuously decreases, thereby accelerating the flow of the air in the first chamber 20, further enhancing the suction effect of the first chamber 20, and improving the massage stimulation effect.

Figure 13:
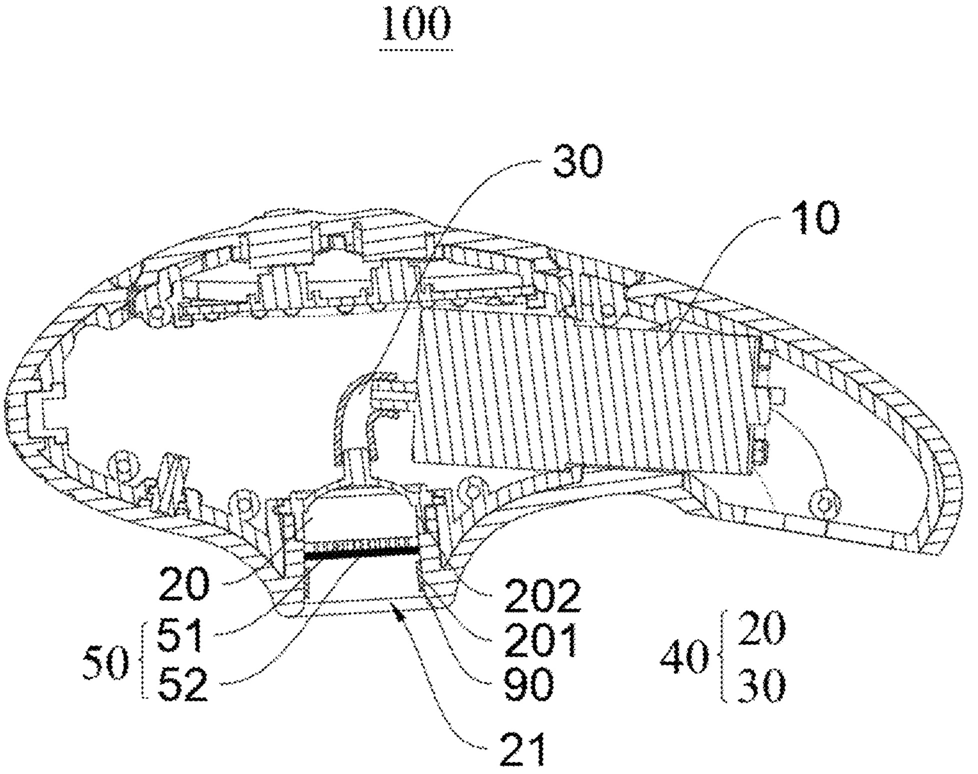
FIG. 13 is a schematic structural diagram of a negative pressure massage structure for sexual stimulation provided in some embodiments of the present disclosure (showing an atomization assembly).

In some embodiments, with reference to FIG. 13 (FIG. 13 is a schematic structural diagram of a negative pressure massage structure for sexual stimulation provided in some embodiments of the present disclosure (showing an atomization assembly)), an atomization assembly 90 is further included, the first chamber 20 has a first end portion 201 and a second end portion 202, the first end portion 201 is close to the first opening 21, the second end portion 202 is close to the first connection channel 30, and the atomization assembly 90 is disposed on the first end portion 201.

The atomization assembly 90 may be a piezoelectric ceramic sheet, and the piezoelectric ceramic sheet produces a cavitation effect by generating a high-frequency vibration of 1.7 MHz-3.5 MHz, such that water molecules are instantly decomposed into micron-sized water mist.

The atomization assembly 90 may further include an air outlet, a dry air source, and a throttle valve, where the air outlet communicates with the dry air source through a pipeline, the throttle valve is disposed on the pipeline, and pressure of the air input into the pipeline from the dry air source is controlled through the throttle valve, such that fast-flowing airflow is sprayed from the air outlet, thereby dispersing liquid substances.

In this embodiment, the atomization assembly 90 is disposed on the first end portion 201 of the first chamber 20, and since the atomization assembly 90 is capable of atomizing liquid substances, the atomization assembly 90 breaks residual liquid substances on the inner wall of the first chamber 20 into numerous tiny droplet clusters that suspend in the air to form a gas-liquid two-phase flow, thereby reducing a probability of liquid substances remaining on a surface of the inner wall of the first chamber 20.

Figure 14:
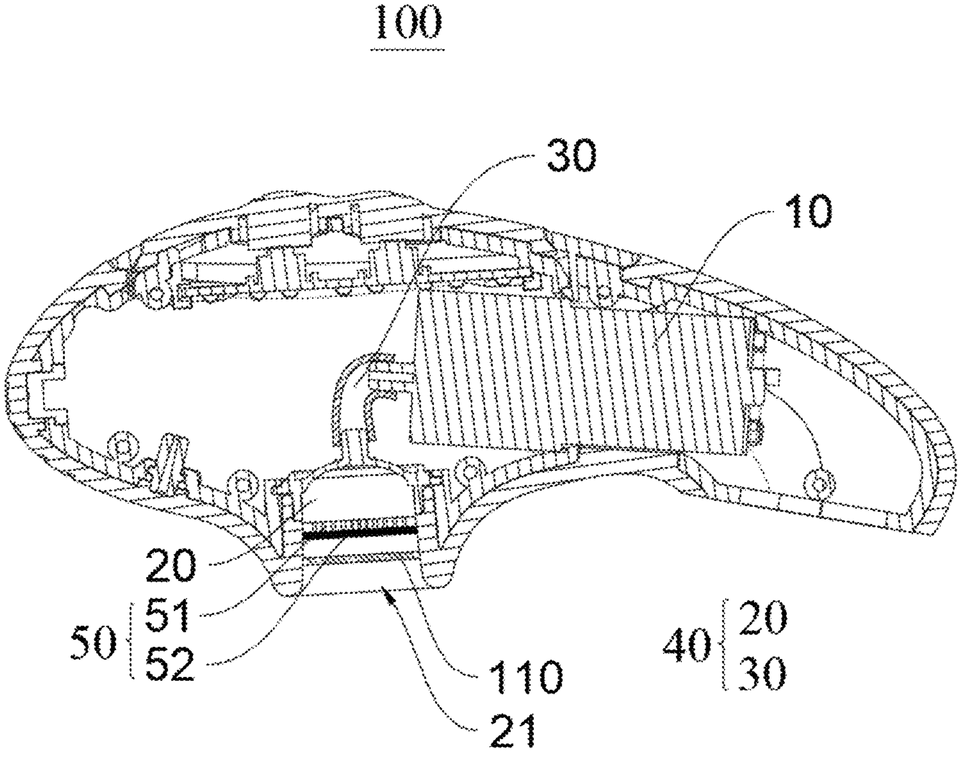
FIG. 14 is a schematic structural diagram of a negative pressure massage structure for sexual stimulation provided in some embodiments of the present disclosure (showing a protective member).
Figure 15:
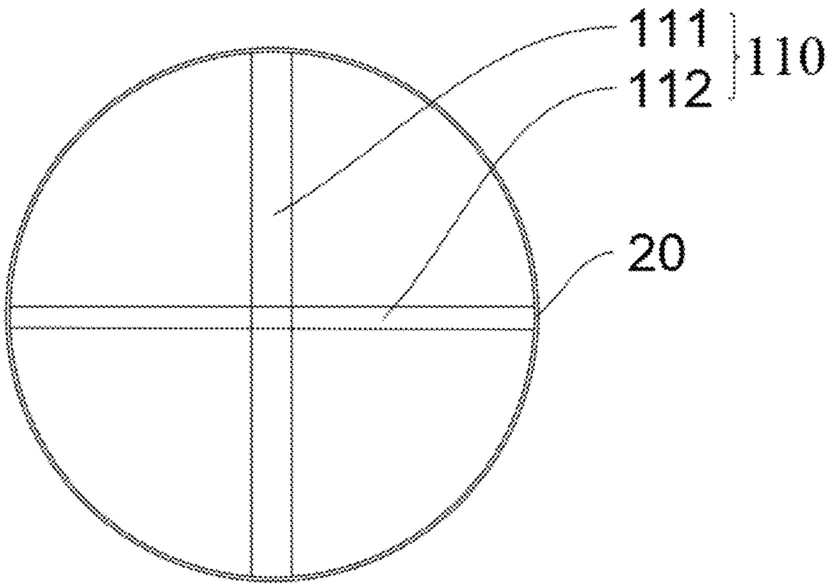
FIG. 15 is a schematic structural diagram of a negative pressure massage structure for sexual stimulation provided in other embodiments of the present disclosure (showing a protective member).

In some embodiments, with reference to FIGS. 14 and 15 (FIG. 14 is a schematic structural diagram of a negative pressure massage structure for sexual stimulation provided in some embodiments of the present disclosure (showing a protective member), and FIG. 15 is a schematic structural diagram of a negative pressure massage structure for sexual stimulation provided in other embodiments of the present disclosure (showing a protective member), a protective member 110 is further included, the protective member 110 is disposed in the first airflow channel 40, and the protective member 110 is located between the first opening 21 and the waterproof-breathable assembly 50.

The protective member 110 may be disposed in the first connection channel 30 or the first chamber 20.

The protective member 110 may include a first protective member 111 and a second protective member 112, one first protective member 111 and one second protective member 112 may be provided, or a plurality of first protective members 111 and a plurality of second protective members 112 may be provided.

In an embodiment where one first protective member 111 and one second protective member 112 are provided, two ends of the first protective member 111 are respectively connected to an inner wall of the first connection channel 30 or the inner wall of the first chamber 20, two ends of the second protective member 112 are respectively connected to the inner wall of the first connection channel 30 or the inner wall of the first chamber 20, and the first protective member 111 and the second protective member 112 are arranged crosswise to form a cross-shaped structure.

In an embodiment where a plurality of first protective members 111 and a plurality of second protective members 112 are provided, two ends of each first protective member 111 in the plurality of first protective members 111 are respectively connected to the inner wall of the first connection channel 30 or the inner wall of the first chamber 20, two ends of each second protective member 112 in the plurality of second protective members 112 are respectively connected to the inner wall of the first connection channel 30 or the inner wall of the first chamber 20, and each first protective member 111 and each second protective member 112 are arranged crosswise to form a mesh structure.

The protective member 110 has the cross-shaped structure or the mesh structure, such that the protective member 110 has air permeability.

In this embodiment, the protective member 110 is disposed in the first airflow channel 40 and located between the first opening 21 and the waterproof-breathable assembly 50, and due to the protective function of the protective member 110, the protective member 110 effectively prevents the user's fingers from directly coming into contact with the waterproof-breathable assembly 50 when the user cleans the negative pressure massage structure 100, thereby reducing a probability that an external force generated by the fingers directly acts on the waterproof-breathable assembly 50, and further extends the service life of the waterproof-breathable assembly 50.

In some embodiments, the first opening 21 is made of a flexible material, and the flexible material is one or more of a thermoplastic elastomer (TPE), a polyolefin elastomer (POE), polyvinyl chloride (PVC), silicone, and liquid silicone.

In this embodiment, the first opening 21 is made of a flexible material, and the flexible material is one or more of TPE, POE, PVC, silicone, and liquid silicone, and since the materials such as TPE, POE, PVC, silicone, or liquid silicone have lower Shore hardness, the first opening 21 has a lower elastic modulus, so the first opening 21 is softer and more prone to deformation; and therefore, during use, the first opening 21 is more likely to deform based on the shape of the target massage area, such that the first opening 21 better fits the skin of the target massage area, and the massage stimulation effect is further enhanced.

Figure 16:
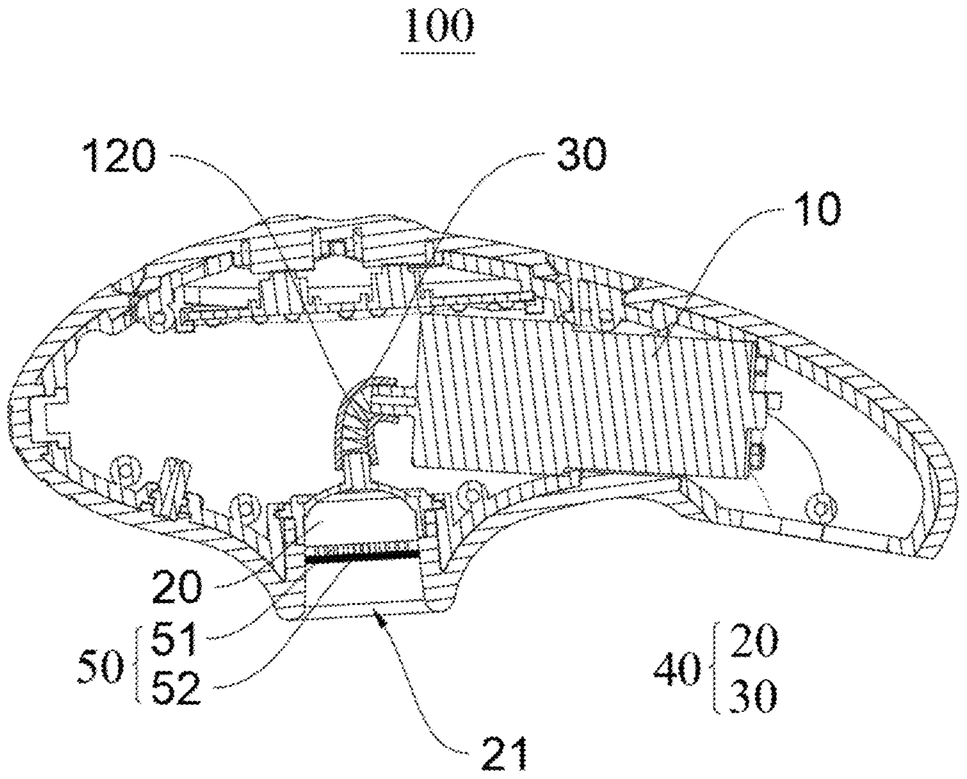
FIG. 16 is a schematic structural diagram of a negative pressure massage structure for sexual stimulation provided in some embodiments of the present disclosure (showing a first elastic member).

In some embodiments, with reference to FIG. 16 (FIG. 16 is a schematic structural diagram of a negative pressure massage structure for sexual stimulation provided in some embodiments of the present disclosure (showing a first elastic member)), a first elastic member 120 is further included, and the first elastic member 120 is sleeved in the first connection channel 30.

The first elastic member 120 may be a spring or a metal elastic sheet.

In an embodiment where the first elastic member 120 is a spring, a length of the spring may be the same as a length of the first connection channel 30.

In this embodiment, since the deformation capacity of the first connection channel 30 is limited, the first connection channel 30 cannot return to its initial state after being bent under the action of an external force, thereby reducing a circulation area of the first connection channel 30, further compromising the suction effect of the negative pressure generating assembly 10, and thus reducing the massage stimulation effect of the negative pressure massage structure 100; and therefore, by sleeving the first elastic member 120 in the first connection channel 30 and enhancing the deformation capacity of the first connection channel 30 based on the deformation capacity of the first elastic member 120, the present disclosure enables the first connection channel 30 to return to its initial state after being bent, which further reduces the influence of the change in the circulation area on the massage stimulation effect of the negative pressure massage structure 100.

Figure 17:
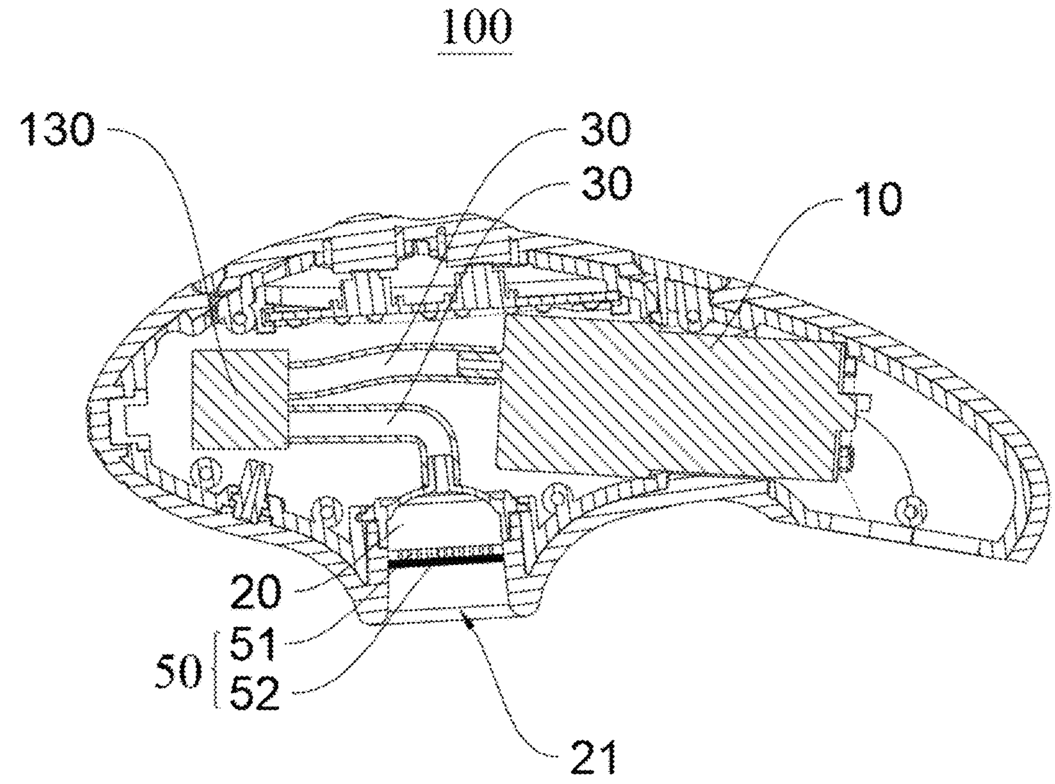
FIG. 17 is a schematic structural diagram of a negative pressure massage structure for sexual stimulation provided in some embodiments of the present disclosure (showing a solenoid valve).

In some embodiments, with reference to FIG. 17 (FIG. 17 is a schematic structural diagram of a negative pressure massage structure for sexual stimulation provided in some embodiments of the present disclosure (showing a solenoid valve)), a solenoid valve 130 is further included, the solenoid valve 130 is disposed on the first connection channel 30, and the solenoid valve 130 controls the opening or closing of the first connection channel 30.

In an embodiment where the negative pressure massage structure 100 includes the solenoid valve 130, the negative pressure massage structure 100 may include a circuit control assembly (not shown in FIG. 17), the circuit control assembly (not shown in FIG. 17) is electrically connected to the solenoid valve 130 and the negative pressure generating assembly 10 respectively, the circuit control assembly (not shown in FIG. 17) controls the opening or closing of the solenoid valve 130, and the circuit control assembly (not shown in FIG. 17) controls the opening or closing of the negative pressure generating assembly 10.

In this embodiment, since the negative pressure generating assembly 10 only continuously outputs negative pressure to the target massage area, prolonged use may lead to local muscle tension or numbness in the target massage area; therefore, the solenoid valve 130 is disposed on the first connection channel 30, such that the first connection channel 30 may be quickly opened or closed through the solenoid valve 130, pulsed negative pressure is formed in the first chamber 20, and alternating actions of adsorption, release, re-adsorption, and re-release on the target massage area are performed at the first opening 21, where during an adsorption action, the skin and subcutaneous muscles of the target massage area are slightly pulled up (simulating an action of pinching and lifting by fingers); and during a release action, the skin and subcutaneous muscles of the target massage area elastically retract (similar to relaxation and rebounding). The alternating stimulation more effectively activates muscle proprioceptors, promotes local blood circulation, and achieves a better relaxation effect. Different target massage areas of the human body exhibit significantly different tolerances to negative pressure, and the solenoid valve 130 may further control a duration of each negative pressure adsorption of massage by the negative pressure generating assembly 10, thereby controlling an adsorption intensity to meet massage needs of different target massage areas.

Figure 18:
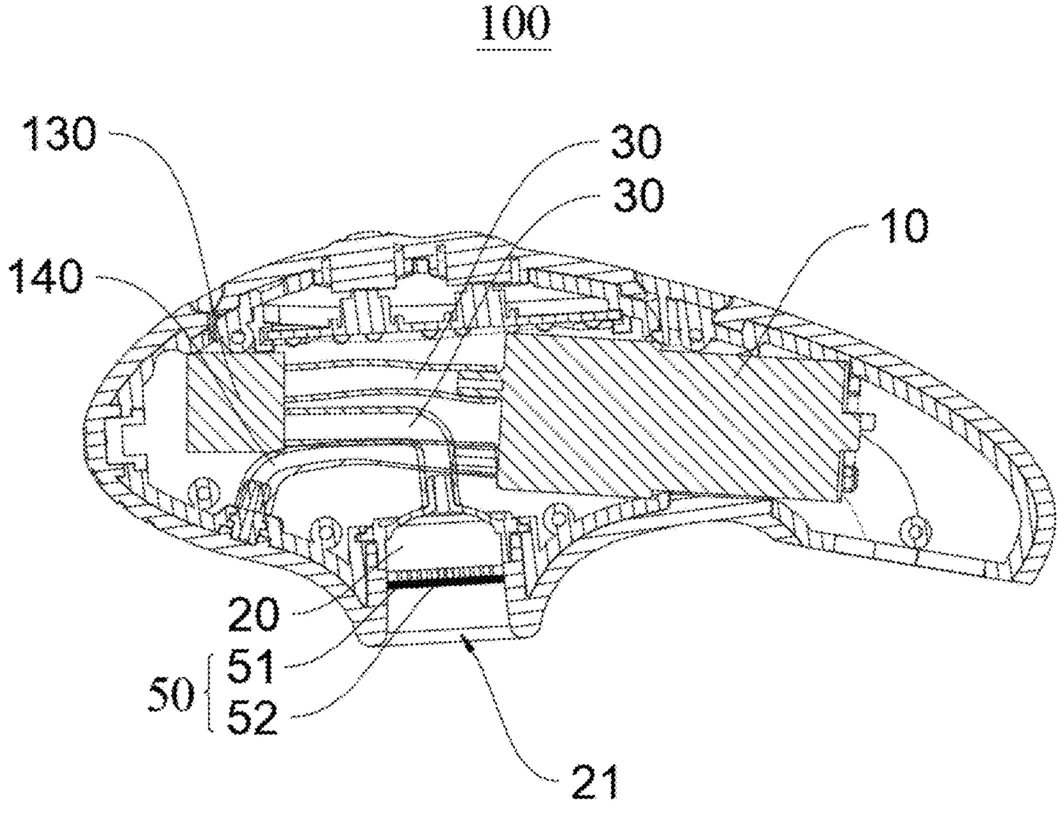
FIG. 18 is a schematic structural diagram of a negative pressure massage structure for sexual stimulation provided in some embodiments of the present disclosure (showing a second connection channel)).

In some embodiments, with reference to FIG. 18 (FIG. 18 is a schematic structural diagram of a negative pressure massage structure for sexual stimulation provided in some embodiments of the present disclosure (showing a second connection channel)), a second connection channel 140 is further included, one end of the second connection channel 140 communicates with the negative pressure generating assembly 10, and the other end thereof communicates with an exterior of the negative pressure massage structure 100, where when the solenoid valve 130 closes the first connection channel 30, the negative pressure generating assembly 10 extracts air through the second connection channel 140.

In this embodiment, the second connection channel 140 is provided, one end of the second connection channel 140 communicates with the negative pressure generating assembly 10, and the other end thereof communicates with the exterior of the negative pressure massage structure 100, such that when the negative pressure massage structure 100 adsorbs the skin of the target massage area, the solenoid valve 130 opens the first connection channel 30, the second connection channel 140 is shunted by the first connection channel 30 due to an adsorption force of the negative pressure generating assembly 10 (in this case, there is no significant air intake in the second connection channel 140), and the first chamber 20 forms negative pressure through the first connection channel 30, and massages and stimulates the target massage area through the first opening 21; when the solenoid valve 130 closes the first connection channel 30, the negative pressure generating assembly 10 immediately sucks external air through the second connection channel 140, such that the negative pressure generating assembly 10 operates continuously with pressure stability; when the second connection channel 140 is not provided, an instantaneous pressure impact is caused by pathway blockage of the negative pressure generating assembly 10 when the solenoid valve 130 closes the first connection channel 30; when the negative pressure generating assembly 10 is reactivated again, an adsorption force generated by the negative pressure generating assembly 10 may drop or rise sharply, such that the skin is easily sucked or pulled violently (the user feels a stinging sensation); and therefore, arrangement of the second connection channel 140 enables continuous air intake to balance the pressure of the negative pressure generating assembly 10, such that when the solenoid valve 130 controls the opening or closing of the first connection channel 30, the adsorption force generated by the negative pressure generating assembly 10 does not change suddenly, thereby enhancing the user's comfort in use.

Figure 19:
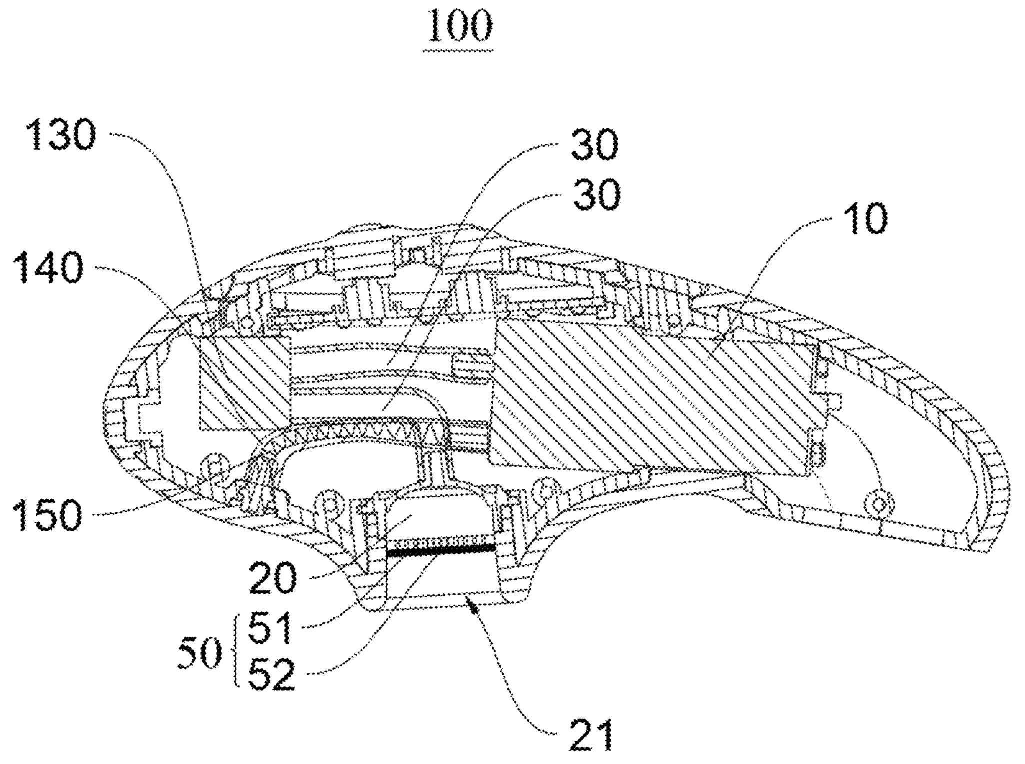
FIG. 19 is a schematic structural diagram of a negative pressure massage structure for sexual stimulation provided in some embodiments of the present disclosure (showing a second elastic member).

In some embodiments, with reference to FIG. 19 (FIG. 19 is a schematic structural diagram of a negative pressure massage structure for sexual stimulation provided in some embodiments of the present disclosure (showing a second elastic member)), a second elastic member 150 is further included, and the second elastic member 150 is sleeved in the second connection channel 140.

The second elastic member 150 may be a spring or a metal elastic sheet.

In an embodiment where the second elastic member 150 is a spring, a length of the spring may be the same as a length of the second connection channel 140.

In this embodiment, since the deformation capacity of the second connection channel 140 is limited, the second connection channel 140 cannot return to its initial state after being bent under the action of an external force, thereby reducing a circulation area of the second connection channel 140, further compromising the suction effect of the negative pressure generating assembly 10, and thus reducing the massage effect of the negative pressure massage structure 100; and therefore, by sleeving the second elastic member

150 in the second connection channel 140 and enhancing the deformation capacity of the second connection channel 140 based on the deformation capacity of the second elastic member 150, the present disclosure enables the second connection channel 140 to return to its initial state after being bent, which further reduces the influence of the change in the circulation area on the massage stimulation effect of the negative pressure massage structure 100.

Figure 20:
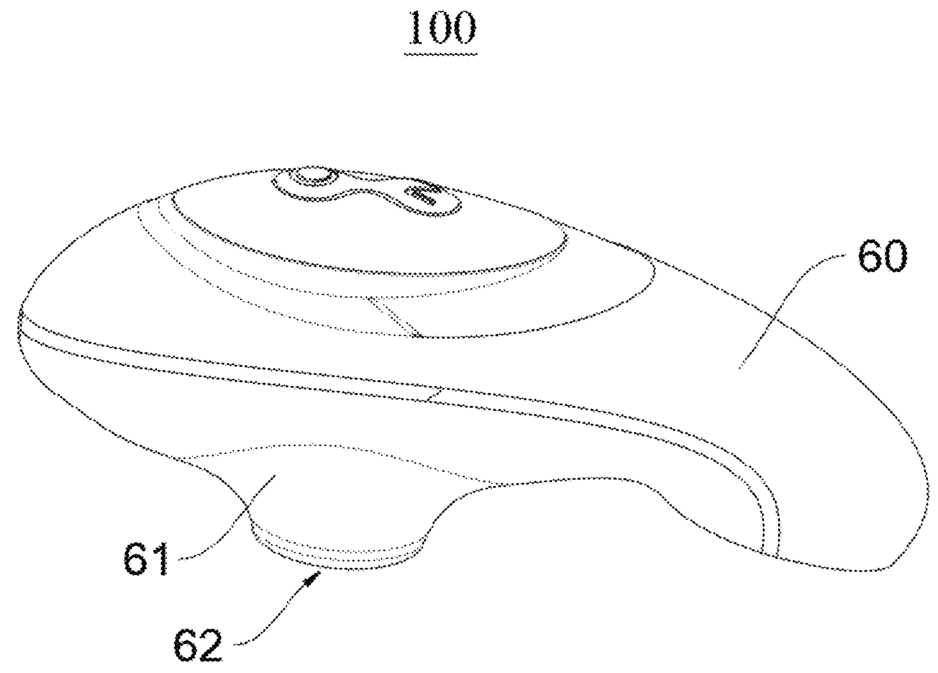
FIG. 20 is a schematic structural diagram of a negative pressure massage structure for sexual stimulation provided in some embodiments of the present disclosure (showing a first housing).
Figure 21:
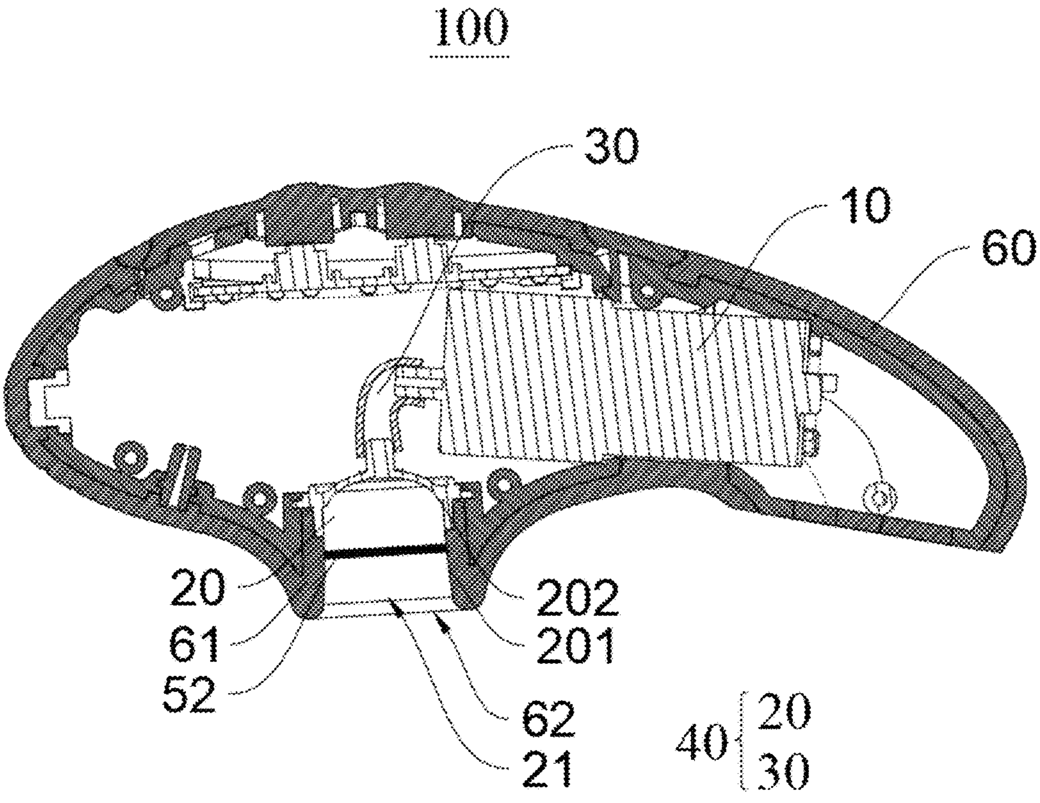
FIG. 21 is a schematic structural diagram of a negative pressure massage structure for sexual stimulation provided in other embodiments of the present disclosure (showing a first housing).
Figure 22:
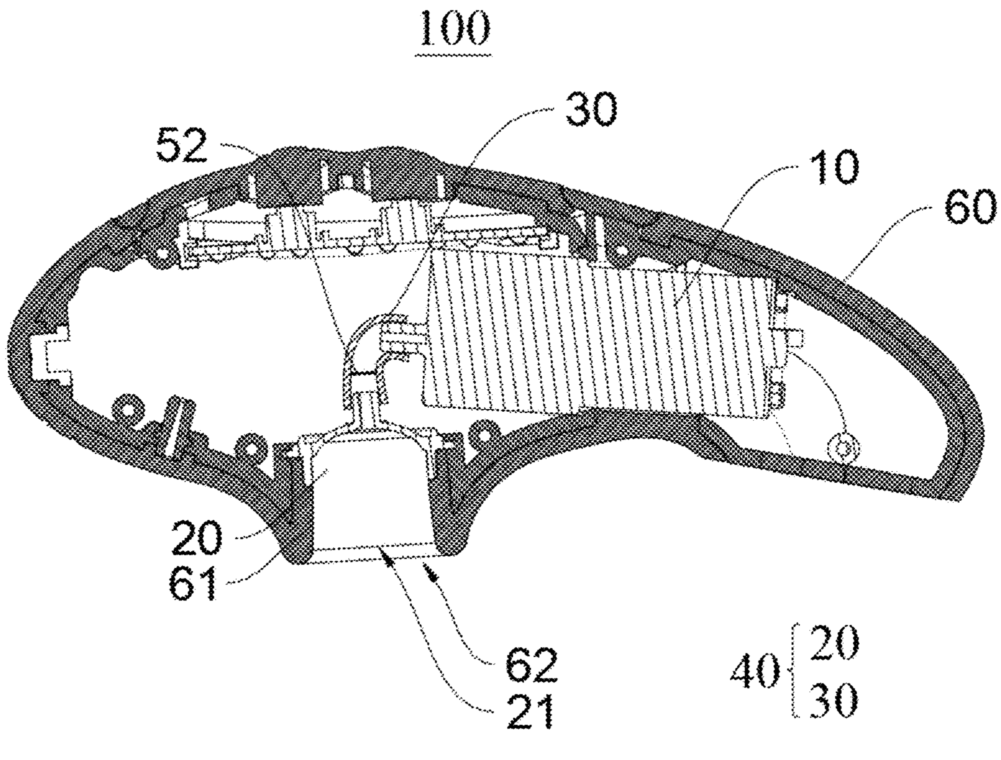
FIG. 22 is a schematic structural diagram of a negative pressure massage structure for sexual stimulation provided in yet other embodiments of the present disclosure (showing a first housing).
Figure 23:
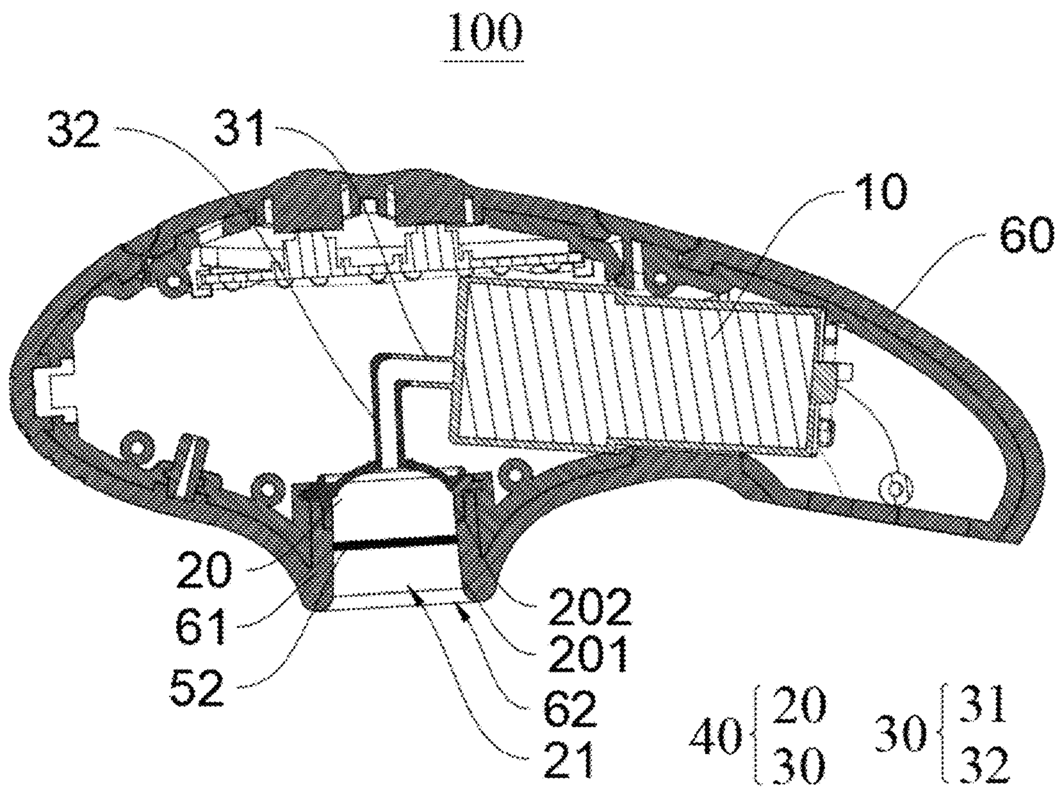
FIG. 23 is a schematic structural diagram of a negative pressure massage structure for sexual stimulation provided in yet other embodiments of the present disclosure (showing a first air outlet part and a first air inlet part).
Figure 24:
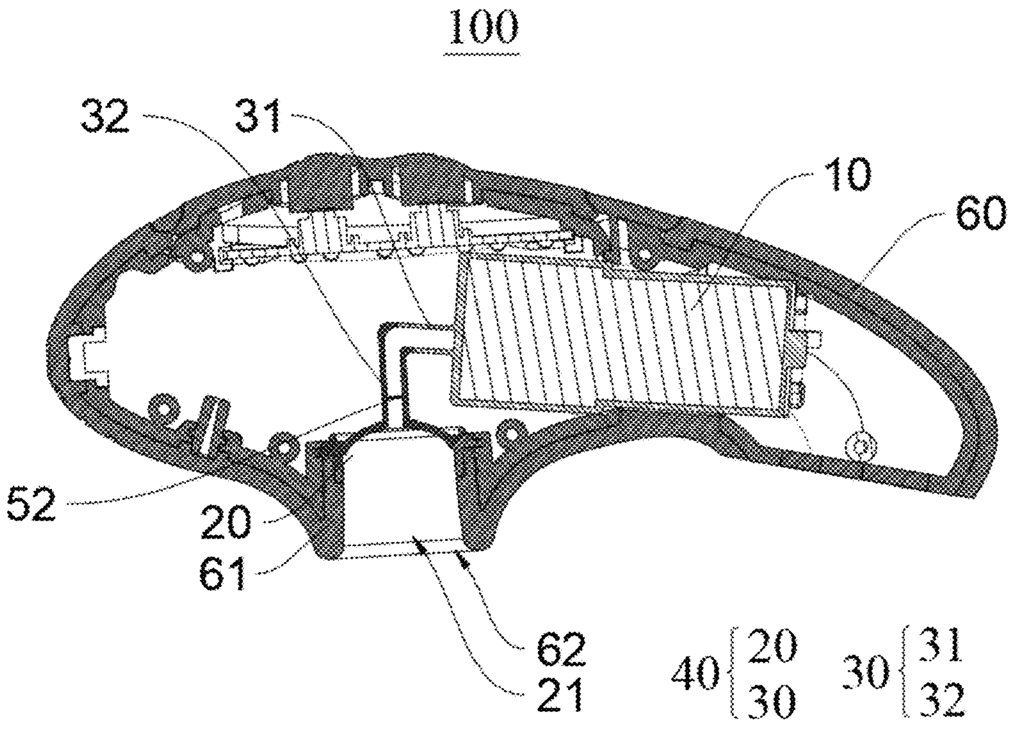
FIG. 24 is a schematic structural diagram of a negative pressure massage structure for sexual stimulation provided in still other embodiments of the present disclosure (showing a first air outlet part and a first air inlet part).

In some embodiments, please refer to FIGS. 20 to 24, where FIG. 20 is a schematic structural diagram of a negative pressure massage structure for sexual stimulation provided in some embodiments of the present disclosure (showing a first housing), FIG. 21 is a schematic structural diagram of a negative pressure massage structure for sexual stimulation provided in other embodiments of the present disclosure (showing a first housing), FIG. 22 is a schematic structural diagram of a negative pressure massage structure for sexual stimulation provided in yet other embodiments of the present disclosure (showing a first housing), FIG. 23 is a schematic structural diagram of a negative pressure massage structure for sexual stimulation provided in yet other embodiments of the present disclosure (showing a first air outlet part and a first air inlet part), and FIG. 24 is a schematic structural diagram of a negative pressure massage structure for sexual stimulation provided in still other embodiments of the present disclosure (showing a first air outlet part and a first air inlet part). A negative pressure massage structure 100 is provided in an embodiment of the present disclosure, including a negative pressure generating assembly 10, a first chamber 20, a first connection channel 30, a waterproof-breathable assembly 50, and a first housing 60. The first chamber 20 has at least one first opening 21 in contact with a target massage area. The first connection channel 30 connects the first chamber 20 and the negative pressure generating assembly 10, and the first connection channel 30 and the first chamber 20 form a first airflow channel 40. The waterproof-breathable assembly 50 is disposed in the first airflow channel 40, and the waterproof-breathable assembly 50 includes a waterproof-breathable membrane 52 with waterproof-breathable properties. The negative pressure generating assembly 10, the first chamber 20, and the first connection channel 30 are respectively disposed in the first housing 60. The negative pressure generating assembly 10 is configured to generate negative pressure at the first opening 21 via the first airflow channel 40, such that the first opening 21 exerts a stimulation effect on the target massage area.

The first housing 60 accommodates the negative pressure generating assembly 10, the first chamber 20, and the first connection channel 30, and various components in the negative pressure massage structure 100 are protected through the first housing 60.

The first housing 60 may be ergonomically designed, such that the first housing 60 is comfortably held in the user's hand without sharp edges or pointed edges. The first housing 60 may be made of a plastic material, such as polycarbonate (PC) or acrylonitrile butadiene styrene (ABS), and the first housing 60 may also be made of a flexible material, such as silicone or liquid silicone.

The first housing 60 may employ a waterproof or splash-proof design, such as a protection level of IP24.

Part or all of the first housing 60 may be coated with silicone resin with favorable tactile properties.

The first housing 60 may include an outwardly protruding extension portion 61; a second opening 62 configured to come into contact with the target massage area is formed at one end of the extension portion 61 away from the first housing 60; and the first opening 21 of the first chamber 20 may be located in the second opening 62 of the extension portion 61, such that the first opening 21 may communicate with an exterior of the first housing 60 through the second opening 62, and the second opening 62 protrudes from the first opening 21 in a protruding direction of the extension portion 61.

Since the first housing 60 made of a flexible material is relatively soft, the second opening 62 has deformation capacity, and the deformation of the second opening 62 increases a fitting area between the negative pressure massage structure 100 and the target massage area, ensures that a negative pressure effect is more concentrated, reduces invalid air leakage, and improves the massage stimulation effect. Additionally, the second opening 62 protrudes from the first opening 21, such that a stepped structure of adsorption after contact may be formed, that is, the second opening 62 first disperses pressure through large-area contact, thereby preventing local stinging sensation caused by direct adsorption by the first opening 21; and additionally, the deformation of the extension portion 61 enables to absorb an impact force of pressing, which is suitable for areas with weak muscles, thereby expanding a coverage range of the negative pressure massage structure 100.

With further reference to FIGS. 21 and 22, the first connection channel 30 may be a first connection pipeline (not shown in FIGS. 21 and 22), and the first connection pipeline (not shown in FIGS. 21 and 22) may be a hose or a flexible pipe; and in an embodiment where the first connection pipeline (not shown in FIGS. 21 and 22) is a hose, two ends of the hose may be detachably connected to the first chamber 20 and the negative pressure generating assembly 10 respectively, and a detachable connection may be achieved by means of press-fitting or threads.

With further reference to FIGS. 23 and 24, the first connection channel 30 may alternatively include a first air outlet part 31 and a first air inlet part 32, the first air outlet part 31 communicates with the first air inlet part 32, the first air outlet part 31 may be a portion of an outer wall of the negative pressure generating assembly 10, and the first air inlet part 32 may be a portion of an outer wall of the first chamber 20.

A helical groove (not shown in FIGS. 21 to 24) may be formed on the inner wall of the first airflow channel 40, and formation of the helical groove (not shown in FIGS. 21 to 24) enables rotation of an airflow flowing in the first airflow channel 40, where the rotating airflow generates turbulence at the target massage area, thereby improving the massage stimulation effect.

The helical groove (not shown in FIGS. 21 to 24) formed on the inner wall of the first airflow channel 40 may be a helical groove (not shown in FIGS. 21 to 24) formed on an inner wall of the first connection channel 30, and in a direction of airflow, the helical groove (not shown in FIGS. 21 to 24) may extend from one end of the first connection channel 30 to the other end of the first connection channel 30 on the inner wall of the first connection channel 30; alternatively, a helical groove (not shown in FIGS. 21 to 24) may be formed on an inner wall of the first chamber 20, and in a direction of airflow, the helical groove (not shown in FIGS. 21 to 24) may extend from one end of the first chamber 20 to the other end of the first chamber 20 on the inner wall of the first chamber 20; and alternatively, both the inner wall of the first connection channel 30 and the inner wall of the first chamber 20 may be provided with helical grooves (not shown in FIGS. 21 to 24).

In this embodiment, the waterproof-breathable assembly 50 is disposed in the first airflow channel 40, the waterproof-breathable assembly 50 includes the waterproof-breathable membrane 52 with waterproof-breathable properties, and the waterproof-breathable properties of the waterproof-breathable membrane 52 ensure that the waterproof-breathable assembly 50 blocks the passage of liquid substances in the first airflow channel 40 while allowing the passage of air in the first airflow channel 40; since the waterproof-breathable assembly 50 has the waterproof-breathable properties, during the use of the negative pressure massage structure 100, the waterproof-breathable assembly 50 blocks the liquid substances, such that the liquid substances neither enter some areas of the first airflow channel 40 nor enter the negative pressure generating assembly 10 through the first airflow channel 40, which further reduces the probability that when the liquid substances enter some areas of the first airflow channel 40 to form hygienic dead corners or enter the negative pressure generating assembly 10 to cause short circuits in the negative pressure generating assembly 10 during the use of the negative pressure massage structure 100, thereby enhancing reliability of the negative pressure massage structure 100 in use.

In some embodiments, with further reference to FIGS. 21 and 23, the first chamber 20 has a first end portion 201 and a second end portion 202, the first end portion 201 is close to the first opening 21, the second end portion 202 is close to the first connection channel 30, the waterproof-breathable assembly 50 is disposed in the first chamber 20, and the waterproof-breathable assembly 50 is located between the first end portion 201 and the second end portion 202.

In this embodiment, the waterproof-breathable assembly 50 is disposed in the first chamber 20, and the waterproof-breathable assembly 50 is located between the first end portion 201 and the second end portion 202, such that the waterproof-breathable assembly 50 effectively prevents liquid substances from entering narrow spaces (such as the corner area in the second end portion 202 and the internal area of the first connection channel 30), thereby reducing a probability of generating hygienic dead corners, improving the hygiene of the negative pressure massage structure 100, and further enhancing the reliability of the negative pressure massage structure 100 in use.

Figure 25:
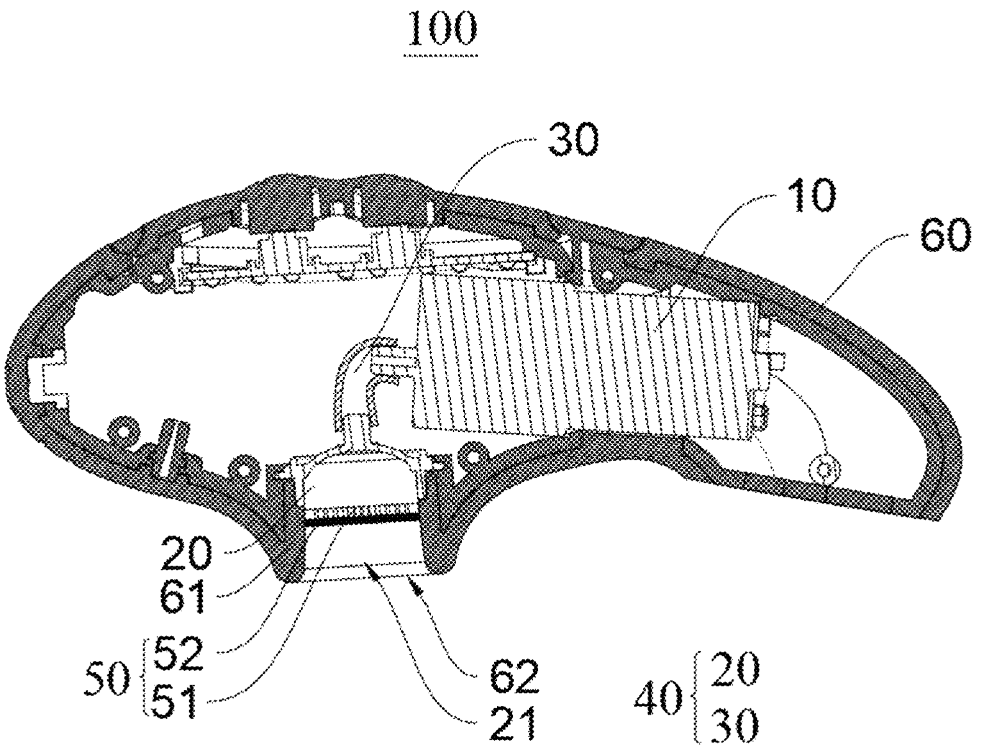
FIG. 25 is a schematic structural diagram of a negative pressure massage structure for sexual stimulation provided in some embodiments of the present disclosure (showing a support member).

In some embodiments, with reference to FIG. 25 (FIG. 25 is a schematic structural diagram of a negative pressure massage structure for sexual stimulation provided in some embodiments of the present disclosure (showing a support member)), the waterproof-breathable assembly 50 further includes a support member 51, the support member 51 is connected to the inner wall of the first airflow channel 40, and the waterproof-breathable membrane 52 is disposed on the support member 51.

In this embodiment, the support member 51 is connected to the inner wall of the first airflow channel 40 and the waterproof-breathable membrane 52 is disposed on the support member 51, and since the support member 51 has a supporting function and the support member 51 is connected to the inner wall of the first airflow channel 40, the support member 51 well supports the waterproof-breathable membrane 52, such that the tensile strength of the waterproof-breathable assembly 50 increases; due to the increased tensile strength of the waterproof-breathable assembly 50, the waterproof-breathable membrane 52 is not easily pulled and damaged by an acting force generated by airflow in a negative pressure operation state; additionally, since the support member 51 is configured to be breathable, the waterproof-breathable assembly 50 plays a more stable waterproof-breathable role in the negative pressure operation state, such that during the use of the negative pressure massage structure 100, since the waterproof-breathable assembly 50 plays the more stable waterproof-breathable role in the negative pressure operation state, the waterproof-breathable assembly 50 blocks the liquid substances, such that the liquid substances neither enter some areas of the first airflow channel 40 nor enter the negative pressure generating assembly 10 through the first airflow channel 40, which further reduces the probability that when the liquid substances enter some areas of the first airflow channel 40 to form hygienic dead corners or enter the negative pressure generating assembly 10 to cause short circuits in the negative pressure generating assembly 10 during the use of the negative pressure massage structure 100, thereby further enhancing reliability of the negative pressure massage structure 100 in use.

In some embodiments, the waterproof-breathable membrane 52 is one or more of an expanded polytetrafluoroethylene membrane, a thermoplastic polyurethane membrane, a polyethylene membrane, an acrylic membrane, a polypropylene membrane, a polyethersulfone membrane, a polyethylene terephthalate membrane, and a polyvinylidene fluoride membrane.

In this embodiment, since the ePTFE membrane, the thermoplastic polyurethane membrane, the polyethylene membrane, the acrylic membrane, the polypropylene membrane, the polyethersulfone membrane, the polyethylene terephthalate membrane, and the polyvinylidene fluoride membrane have good waterproof-breathable properties, flexibility, and chemical stability, the waterproof-breathable membrane 52 is one or more of the ePTFE membrane, the thermoplastic polyurethane membrane, the polyethylene membrane, the acrylic membrane, the polypropylene membrane, the polyethersulfone membrane, the polyethylene terephthalate membrane, and the polyvinylidene fluoride membrane, such that the waterproof-breathable membrane 52 has good waterproof-breathable properties.

Figure 26:
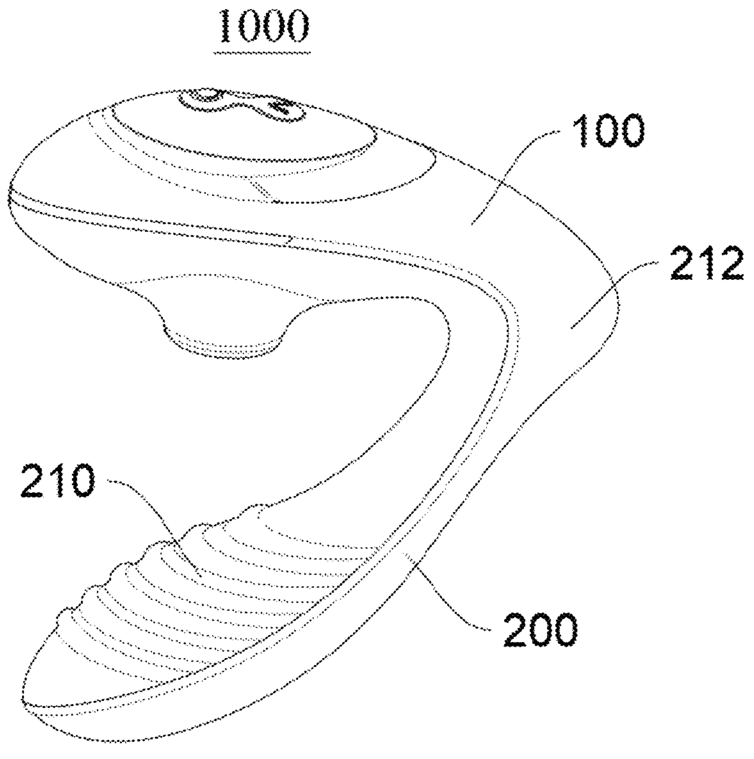
FIG. 26 is a schematic structural diagram of a massage device for sexual stimulation provided in some embodiments of the present disclosure.

In some embodiments, with reference to FIG. 26 (FIG. 26 is a schematic structural diagram of a massage device for sexual stimulation provided in some embodiments of the present disclosure), a massage device 1000 for sexual stimulation is provided in an embodiment of the present disclosure, including a negative pressure massage structure 100 and a first massage structure 200. The negative pressure massage structure 100 includes a negative pressure generating assembly 10, a first chamber 20, a first connection channel 30, and a waterproof-breathable assembly 50. The first chamber 20 has at least one first opening 21 in contact with a target massage area. The first connection channel 30 connects the first chamber 20 and the negative pressure generating assembly 10, and the first connection channel 30 and the first chamber 20 form a first airflow channel 40. The waterproof-breathable assembly 50 is disposed in the first airflow channel 40, the waterproof-breathable assembly 50 includes a support member 51 and a waterproof-breathable membrane 52 with waterproof-breathable properties, the support member 51 is connected to an inner wall of the first airflow channel 40, and the waterproof-breathable membrane 52 is disposed on the support member 51. The negative pressure generating assembly 10 is configured to generate negative pressure at the first opening 21 via the first airflow channel 40, such that the first opening 21 exerts a stimulation effect on the target massage area. The first massage structure 200 is connected to the negative pressure massage structure 100.

The first massage structure 200 may further include a second housing 211, and the second housing 211 may be a portion of the first housing 60 or not a portion of the first housing 60.

The second housing 211 may be ergonomically designed, such that the second housing 211 is comfortably held in the user's hand without sharp edges or pointed edges. The second housing 211 may be made of a flexible material, such as silicone or liquid silicone.

The second housing 211 may employ a waterproof or splash-proof design, such as a protection level of IP24.

A first massage portion 210 may be disposed on a surface of the first massage structure 200, a plurality of first massage portions 210 may be provided, and the plurality of first massage portions 210 may be uniformly distributed on the surface of the first massage structure 200; each of the first massage portions 210 may include a plurality of first protrusions, and a shape of each of the first protrusions may be one or more of a cuboid shape, a cube shape, a sphere shape, a cylinder shape, and a cone shape; and the first massage portion 210 may further include a second protrusion extending uninterruptedly along a surface of the first massage structure 200, and when the second protrusion is elongated, the second protrusion may be a straight line segment. When the shape of the second protrusion is wavy, the second protrusion is composed of a plurality of curved segments connected sequentially, or a plurality of arc segments connected sequentially.

Different contact effects may be generated during a massage process through the first protrusions or the second protrusions, and therefore, the massage stimulation effect may be improved by arranging the first massage portion 210 composed of the first protrusions or the second protrusions.

In some embodiments, with further reference to FIG. 26, a connecting member 212 is further included, and the first massage structure 200 is flexibly connected to the negative pressure massage structure 100 through the connecting member 212.

The connecting member 212 may be a plastically deformable plastic component.

In this embodiment, the negative pressure massage structure 100 and the first massage structure 200 are flexibly connected through the connecting member 212, such that the first massage structure 200 moves relative to the negative pressure massage structure 100 via the connecting member 212, an angle of the first massage structure 200 may be adjusted by rotating the first massage structure 200, and the negative pressure massage structure 100 and the first massage structure 200 massage two different target massage areas simultaneously, thereby further improving the massage stimulation effect.

Figure 27:
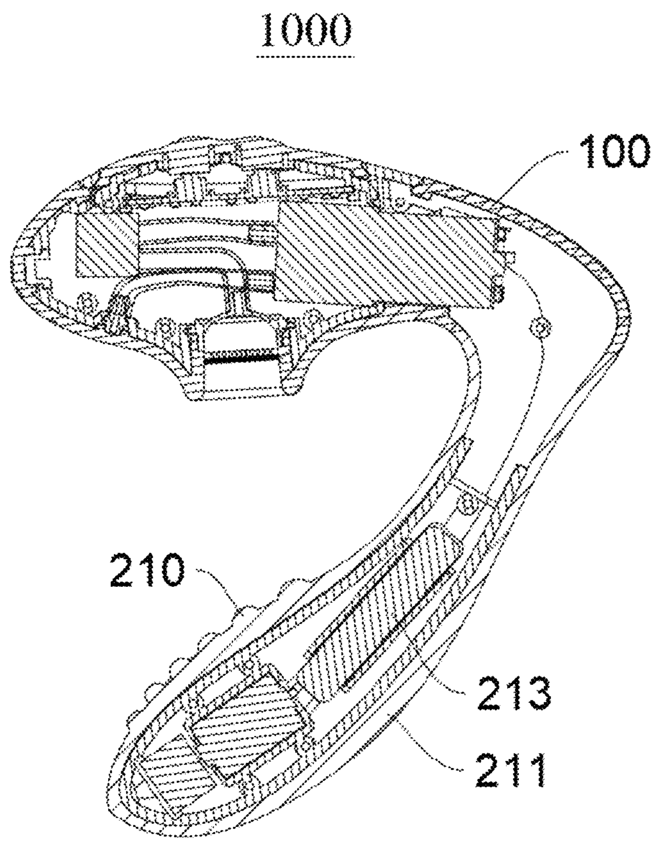
FIG. 27 is a schematic structural diagram of a massage device for sexual stimulation provided in some embodiments of the present disclosure (showing a vibration assembly).

In some embodiments, with reference to FIG. 27 (FIG. 27 is a schematic structural diagram of a massage device for sexual stimulation provided in some embodiments of the present disclosure (showing a vibration assembly)), a vibration assembly 213 is further included, the vibration assembly 213 is disposed in the first massage structure 200, and the vibration assembly 213 drives the first massage structure 200 to vibrate.

The vibration assembly 213 may be a micro vibration motor.

In this embodiment, the vibration assembly 213 is disposed in the first massage structure 200, and the vibration assembly 213 drives the first massage structure 200 to vibrate, thereby providing vibration massage stimulation and further improving the massage stimulation effect.

Figure 28:
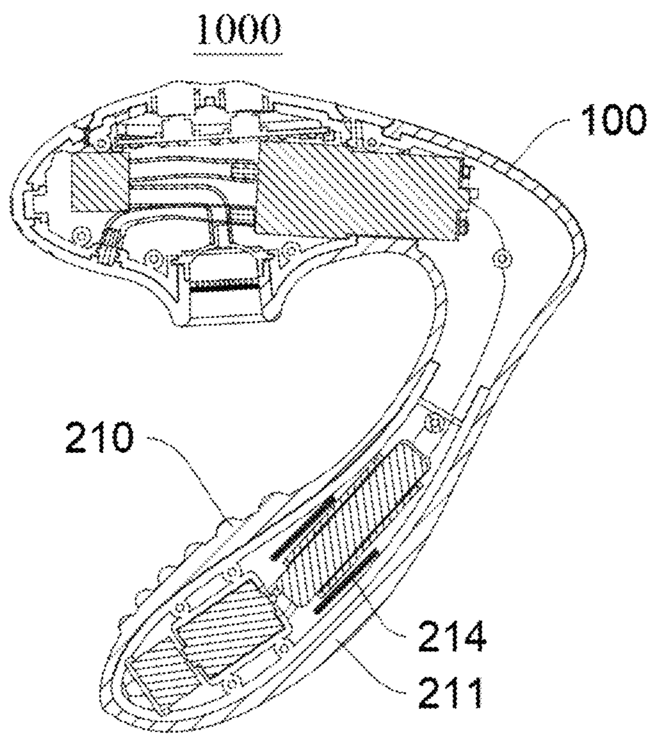
FIG. 28 is a schematic structural diagram of a massage device for sexual stimulation provided in some embodiments of the present disclosure (showing a heating assembly).

In some embodiments, with reference to FIG. 28 (FIG. 28 is a schematic structural diagram of a massage device for sexual stimulation provided in some embodiments of the present disclosure (showing a heating assembly)), a heating assembly 214 is further included, the heating assembly 214 is disposed in the first massage structure 200, and the heating assembly 214 performs heat exchange with the first massage structure 200.

The heating assembly 214 may be a heating sheet.

In this embodiment, the heating assembly 214 is disposed in the first massage structure 200, and the heating assembly 214 enables the first massage structure 200 to simulate a temperature environment during massage, thereby further improving the massage stimulation effect.

The above embodiments are only used to illustrate the technical solutions of the present disclosure, and are not intended to limit the present disclosure. For those skilled in the art, the present disclosure may have various modifications and changes. Any modifications, equivalent substitutions, improvements, and the like within the spirit and principles of the present disclosure are intended to be included within the scope of protection of the present disclosure.

What is claimed is:

1. A negative pressure massage structure for sexual stimulation, comprising:

a negative pressure generating assembly;

a first chamber, wherein the first chamber has at least one first opening configured to be in contact with a target massage area;

a first connection channel, wherein the first connection channel connects the first chamber and the negative pressure generating assembly, and the first connection channel and the first chamber form a first airflow channel; and a waterproof-breathable assembly, wherein the waterproof-breathable assembly is disposed in the first airflow channel, the waterproof-breathable assembly comprises a support member and a waterproof-breathable membrane with waterproof-breathable properties, the support member is connected to an inner wall of the first airflow channel, and the waterproof-breathable membrane is disposed on the support member;

wherein the negative pressure generating assembly is configured to generate negative pressure at the first opening via the first airflow channel, such that the first opening exerts a stimulation effect on the target massage area.

2. The negative pressure massage structure for sexual stimulation according to claim 1, wherein the first chamber has a first end portion and a second end portion, the waterproof-breathable assembly is disposed in the first chamber, and the waterproof-breathable assembly is located between the first end portion and the second end portion.

3. The negative pressure massage structure for sexual stimulation according to claim 1, wherein the negative pressure generating assembly comprises a negative pressure pump.

4. The negative pressure massage structure for sexual stimulation according to claim 1, wherein the waterproof-breathable membrane is coated with a hydrophobic coating.

5. The negative pressure massage structure for sexual stimulation according to claim 1, wherein the waterproof-breathable membrane is one or more of an expanded polytetrafluoroethylene membrane, a thermoplastic polyurethane membrane, a polyethylene membrane, an acrylic membrane, a polypropylene membrane, a polyethersulfone membrane, a polyethylene terephthalate membrane, and a polyvinylidene fluoride membrane.

6. The negative pressure massage structure for sexual stimulation according to claim 1, further comprising a quick-release assembly, wherein the support member is detachably connected to the inner wall of the first airflow channel through the quick-release assembly.

7. The negative pressure massage structure for sexual stimulation according to claim 1, further comprising an atomization assembly, wherein the first chamber has a first end portion and a second end portion, and the atomization assembly is disposed on the first end portion.

8. The negative pressure massage structure for sexual stimulation according to claim 1, further comprising a protective member, wherein the protective member is disposed in the first airflow channel, and the protective member is located between the first opening and the waterproof-breathable assembly.

9. The negative pressure massage structure for sexual stimulation according to claim 1, wherein the first opening is made of a flexible material, and the flexible material is one or more of a thermoplastic elastomer (TPE), a polyolefin elastomer (POE), polyvinyl chloride (PVC), and silicone.

10. The negative pressure massage structure for sexual stimulation according to claim 1, further comprising a first elastic member, wherein the first elastic member is sleeved in the first connection channel.

11. The negative pressure massage structure for sexual stimulation according to claim 1, further comprising a solenoid valve, wherein the solenoid valve is disposed on the first connection channel, and the solenoid valve controls opening or closing of the first connection channel.

12. The negative pressure massage structure for sexual stimulation according to claim 11, further comprising a second connection channel, wherein one end of the second connection channel communicates with the negative pressure generating assembly, and the other end of the second connection channel communicates with an exterior of the negative pressure massage structure, wherein when the solenoid valve closes the first connection channel, the negative pressure generating assembly extracts air through the second connection channel.

13. A negative pressure massage structure for sexual stimulation, comprising:

a negative pressure generating assembly;

a first chamber, wherein the first chamber has at least one first opening configured to be in contact with a target massage area;

a first connection channel, wherein the first connection channel connects the first chamber and the negative pressure generating assembly, and the first connection channel and the first chamber form a first airflow channel;

a waterproof-breathable assembly, wherein the waterproof-breathable assembly is disposed in the first airflow channel, and the waterproof-breathable assembly comprises a waterproof-breathable membrane with waterproof-breathable properties; and a first housing, wherein the negative pressure generating assembly, the first chamber, and the first connection channel are respectively disposed in the first housing;

wherein the negative pressure generating assembly is configured to generate negative pressure at the first opening via the first airflow channel, such that the first opening exerts a stimulation effect on the target massage area.

14. The negative pressure massage structure for sexual stimulation according to claim 13, wherein the first chamber has a first end portion and a second end portion, the waterproof-breathable assembly is disposed in the first chamber, and the waterproof-breathable assembly is located between the first end portion and the second end portion.

15. The negative pressure massage structure for sexual stimulation according to claim 13, wherein the waterproof-breathable assembly further comprises a support member, the support member is connected to an inner wall of the first airflow channel, and the waterproof-breathable membrane is disposed on the support member.

16. The negative pressure massage structure for sexual stimulation according to claim 13, wherein the waterproof-breathable membrane is one or more of an expanded polytetrafluoroethylene membrane, a thermoplastic polyurethane membrane, a polyethylene membrane, an acrylic membrane, a polypropylene membrane, a polyethersulfone membrane, a polyethylene terephthalate membrane, and a polyvinylidene fluoride membrane.

17. A massage device for sexual stimulation, comprising:

a negative pressure massage structure, wherein the negative pressure massage structure comprises:

a negative pressure generating assembly;

a first chamber, wherein the first chamber has at least one first opening configured to be in contact with a target massage area;

a first connection channel, wherein the first connection channel connects the first chamber and the negative pressure generating assembly, and the first connection channel and the first chamber form a first airflow channel; and a waterproof-breathable assembly, wherein the waterproof-breathable assembly is disposed in the first airflow channel, the waterproof-breathable assembly comprises a support member and a waterproof-breathable membrane with waterproof-breathable properties, the support member is connected to an inner wall of the first airflow channel, and the waterproof-breathable membrane is disposed on the support member;

wherein the negative pressure generating assembly is configured to generate negative pressure at the first opening via the first airflow channel, such that the first opening exerts a stimulation effect on the target massage area; and a first massage structure, wherein the first massage structure is connected to the negative pressure massage structure.

18. The massage device for sexual stimulation according to claim 17, further comprising a connecting member, wherein the first massage structure is flexibly connected to the negative pressure massage structure through the connecting member.

19. The massage device for sexual stimulation according to claim 17, further comprising a vibration assembly, wherein the vibration assembly is disposed in the first massage structure, and the vibration assembly drives the first massage structure to vibrate.

20. The massage device for sexual stimulation according to claim 17, further comprising a heating assembly, wherein the heating assembly is disposed in the first massage structure, and the heating assembly performs heat exchange with the first massage structure.

* * * * *